(12) United States Patent
Takamizawa et al.

(10) Patent No.: US 12,316,917 B2
(45) Date of Patent: May 27, 2025

(54) MOBILE CONTENT VIEWING DEVICE AND CONTENT VIEWING METHOD

(71) Applicant: MAXELL, LTD., Kyoto (JP)

(72) Inventors: Naohisa Takamizawa, Kyoto (JP); Yasunobu Hashimoto, Kyoto (JP)

(73) Assignee: MAXELL, LTD., Kyoto (JP)

( * ) Notice: Subject to any disclaimer, the term of this patent is extended or adjusted under 35 U.S.C. 154(b) by 9 days.

(21) Appl. No.: 18/022,798

(22) PCT Filed: Aug. 26, 2020

(86) PCT No.: PCT/JP2020/032108
§ 371 (c)(1),
(2) Date: Feb. 23, 2023

(87) PCT Pub. No.: WO2022/044145
PCT Pub. Date: Mar. 3, 2022

(65) Prior Publication Data
US 2023/0328328 A1    Oct. 12, 2023

(51) Int. Cl.
*H04N 21/472* (2011.01)
*H04N 21/41* (2011.01)
*H04N 21/422* (2011.01)
*H04N 21/4223* (2011.01)
*H04N 21/431* (2011.01)

(52) U.S. Cl.
CPC ... *H04N 21/47217* (2013.01); *H04N 21/4126* (2013.01); *H04N 21/42202* (2013.01); *H04N 21/4223* (2013.01); *H04N 21/4312* (2013.01)

(58) Field of Classification Search
CPC ......... H04N 21/47217; H04N 21/4126; H04N 21/42202; H04N 21/4223; H04N 21/4312
See application file for complete search history.

(56) References Cited

FOREIGN PATENT DOCUMENTS

| CN | 103701984 A | * | 4/2014 |
|---|---|---|---|
| JP | 2003-333463 A | | 11/2003 |
| JP | 2007-228551 A | | 9/2007 |
| JP | 2008-085398 A | | 4/2008 |
| JP | 2011-017802 A | | 1/2011 |
| JP | 2015-015593 A | | 1/2015 |

OTHER PUBLICATIONS

International Search Report of PCT/JP2021/046885 dated Nov. 24, 2020.

* cited by examiner

*Primary Examiner* — Joshua D Taylor
(74) *Attorney, Agent, or Firm* — Mattingly & Malur, PC

(57) ABSTRACT

A mobile content viewing device plays and displays content on a display, stores a scene and a time in which the content is played and displayed, acquires a measured value of a light quantity sensor, compares the measured value with a predetermined natural light threshold value if determined the measured value is equal to or greater than the natural light threshold value, suggests re-viewing in which the content is returned to and played from a scene of the content displayed on the display at that time, and plays and displays the content again from the scene of the content displayed on the display at that if an input of an instruction for the re-viewing received.

13 Claims, 24 Drawing Sheets

FIG. 7
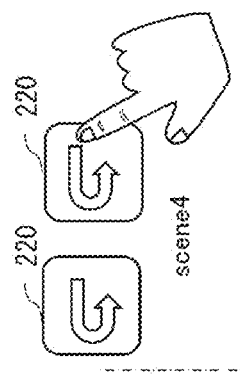
RE-VIEWING BUTTON DISPLAYED
RE-VIEWING BUTTON PRESSED
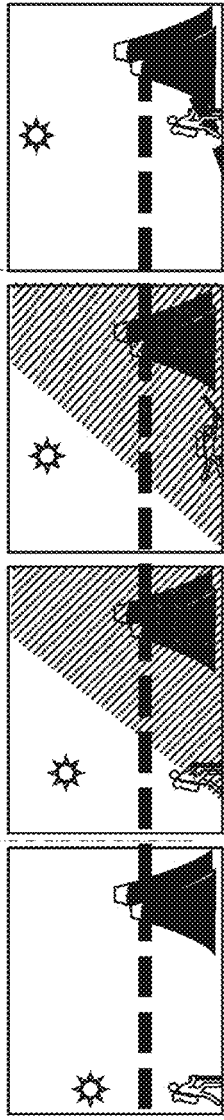
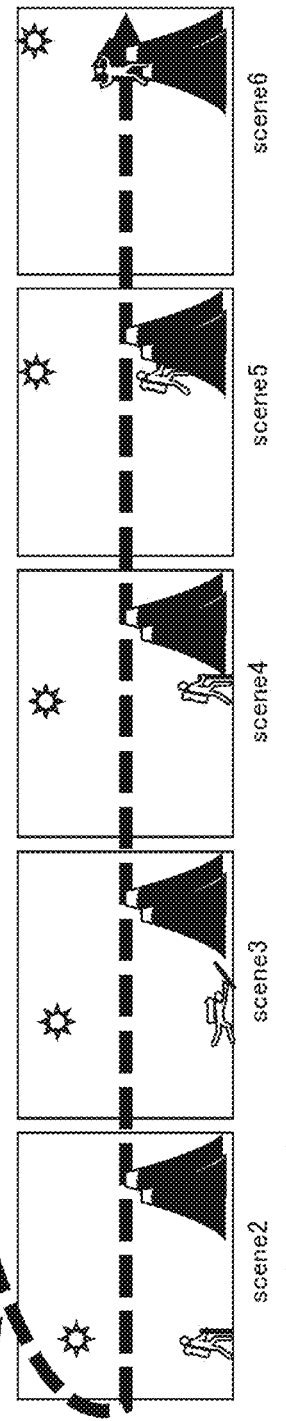
ORDER IN WHICH CONTENT IS PLAYED IN CASE WHERE REPRODUCTION/RE-VIEWING PROCESS IS PERFORMED

MOBILE CONTENT VIEWING DEVICE AND CONTENT VIEWING METHOD

TECHNICAL FIELD

The present invention relates to a mobile content viewing device and a content viewing method.

BACKGROUND ART

As a background technology in this technical field, PTL 1 discloses a video reproduction device that includes "a video data reproduction unit, a sensor unit that includes at least one sensor for detecting the occurrence of a viewing inhibition event, an acquisition unit that acquires an instruction from a user, and a control unit that monitors the occurrence of a viewing inhibition event based on output of each sensor of the sensor unit during reproduction of video data by the video data reproduction unit, causes positional information indicating a played portion of the video data at the time of the occurrence of the viewing inhibition event to be stored in an EEPROM, and causes the video data reproduction unit to play the video data from the portion corresponding to the positional information when a user provides a specific instruction in a state in which the positional information is stored in the EEPROM" (Abstract excerpted). In PTL 1, an environment sound is exemplified as the viewing inhibition event. An aspect in which an earthquake or reception of a call is detected as a viewing inhibition event in the video reproduction device that is a portable device is disclosed.

CITATION LIST

Patent Literature

Patent Literature 1: Japanese Unexamined Patent Application Publication No. 2015-15593A

SUMMARY OF INVENTION

Technical Problem

In recent years, with the spread of mobile devices and the enhancement of recording and distribution environments, the number of people who view content outdoors (in trains and the like) is increasing. When a person views content on a smartphone, a tablet, or the like outdoors (in a train or the like), there is an effect specific to outdoors where the influence of ambient natural light rapidly changes when the person moves from a shaded place to a place in the sun or from a place in the sun to a shaded place. When the quantity of natural light changes, the screen becomes difficult to see and affects content viewing. Therefore, there is a demand for mobile devices to deal with natural light. However, PTL 1 does not take into consideration the occurrence of an event of inhibiting content viewing due to natural light encountered in an outdoor environment.

The present invention has been made in view of the above-described circumstances, and an object of the present invention is to provide a mobile content viewing device and method that are able to handle an event of inhibiting content viewing due to natural light.

Solution to Problem

To solve the above-described problems, the present invention includes configurations described in the claims. As an example thereof, the present invention is a mobile content viewing device that includes a light quantity sensor, a display, an operation member, and a processor connected to the light quantity sensor, the display, and the operation member. The processor plays and displays content on the display. The processor associates and stores a scene and a time in which the content is played and displayed, acquires a measured value of the light quantity sensor, and compares the measured value with a predetermined natural light threshold value. When the processor determines that the measured value is equal to or greater than the natural light threshold value, the processor suggests re-viewing in which the content is returned to and played from a scene of the content displayed on the display at a time when the processor determines that the measured value is equal to or greater than the natural light threshold value. When the processor receives input of an instruction for the re-viewing from the operation member, the processor plays and displays the content again from the scene of the content displayed on the display at the time when the processor determines that the measured value is equal to or greater than the natural light threshold value.

In addition, the present invention is a mobile content viewing device that includes a light quantity sensor, a display, an operation member, a timer, and a processor connected to the light quantity sensor, the display, the operation member, and the timer. The processor plays and displays content on the display, associates and stores a scene and a time in which the content is d and displayed, acquires a measured value of the light quantity sensor, and calculates a natural light threshold value obtained by adding a predetermined light quantity to the measured value. When the processor determines that a time period from a current time to a time when the processor determines that the measured value reaches the natural light threshold value is shorter than a predetermined fixed time period, the processor suggests re-viewing in which the content is returned to and played from a scene of the content displayed at the time when processor determines that the measured value reaches the natural light threshold value. When the processor receives input of an instruction for the re-viewing from the operation member, the processor plays and displays the content again from a scene of the content displayed on the display at a time when the processor determines that the measured value is equal to or greater than the natural light threshold value.

In addition, the present invention is a content viewing method to be executed by a mobile content viewing device, and the content viewing method includes a step of reproducing and displaying content on a display and associating and storing a scene and a time in which the content is played and displayed; a step of acquiring a measured value of a light quantity sensor, comparing the measured value with a predetermined natural light threshold value, and when it is determined that the measured value is equal to or greater than the natural light threshold value, suggesting re-viewing in which the content is returned to and played from a scene of the content displayed on the display at a time when it is determined that the measured value is equal to or greater than the natural light threshold value; and a step of reproducing and displaying, when input of an instruction for the re-viewing is received, the content again from the scene of the content displayed on the display at the time when it is determined that the measured value is equal to or greater than the natural light threshold value.

Advantageous Effects of Invention

According to the present invention, it is possible to provide a mobile content viewing device and method that are able to handle an event of inhibiting content viewing due to natural light. Problems, configurations, and effects other than those described above will be clarified from the following description of embodiments.

BRIEF DESCRIPTION OF DRAWINGS

FIG. 7 is a diagram illustrating the order in which content is played.

DESCRIPTION OF EMBODIMENT

Hereinafter, embodiments of the present invention are described. The same configurations are denoted by the same reference signs in all the drawings, and a duplicate description is omitted.

A mobile content viewing device according to the present embodiment has a natural light threshold value for a natural light quantity measured around a screen of the mobile content viewing device. The mobile content viewing device determines that viewing is inhibited, and performs a re-viewing process when the natural light quantity changes and exceeds the natural light threshold value during the reproduction of content. Although the embodiment is described using a smartphone 100 as an example of the mobile content viewing device, a tablet that is different in size from the smartphone has a component configuration equivalent to the smartphone, and the present invention can be applied to the tablet.

Figure 1:
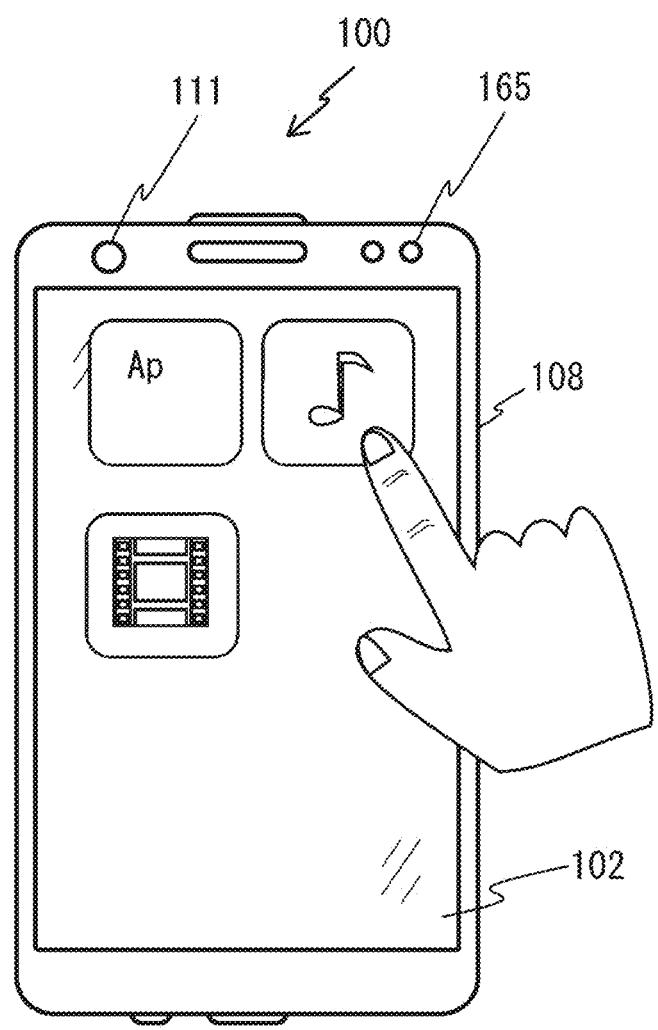
FIG. 1 is a front view of a smartphone according to the present embodiment.
Figure 2:
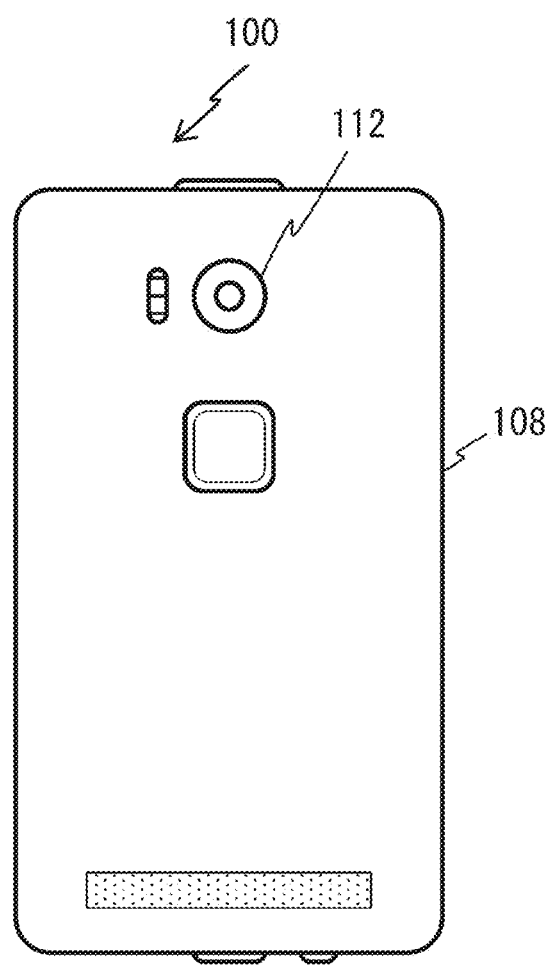
FIG. 2 is a back view of the smartphone according to the present embodiment.

FIG. 1 is a front view of the smartphone 100 according to the present embodiment, and FIG. 2 is a back view of the smartphone 100 according to the present embodiment.

As illustrated in FIG. 1, the smartphone 100 includes a display 102, an in-camera 111, and an illuminance sensor 165 on a front surface of a housing 108. In addition, as illustrated in FIG. 2, the smartphone 100 includes an out-camera 112 on a back surface of the housing 108. The illuminance sensor 165 is one of light quantity sensors. In addition, the in-camera 111 and the out-camera 112 may be used as light quantity sensors, as described later.

Figure 3:
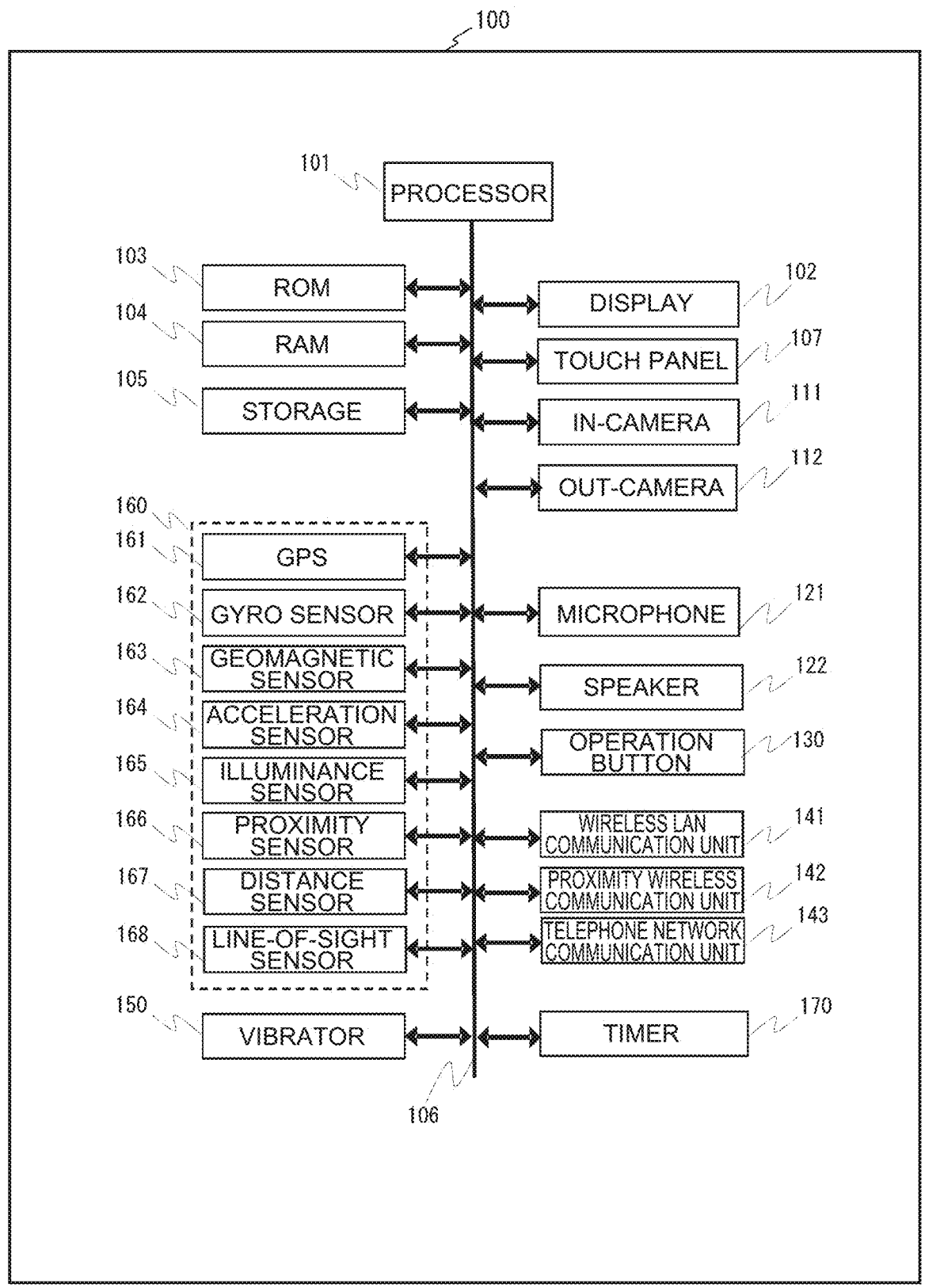
FIG. 3 is a hardware configuration diagram of the smartphone.

FIG. 3 is a hardware configuration diagram of the smartphone 100.

The smartphone 100 includes a processor 101 that is a CPU or an MPU, the display 102, a ROM 103, a RAM 104, storage 105, a touch panel 107 (corresponding to an operation member) stacked on the display 102, the in-camera 111, the out-camera 112, a microphone 121, a speaker 122, an operation button 130 (corresponding to the operation member), a wireless LAN communication unit 141 (for example, a communication unit using Wi-fi (registered trademark)), a proximity wireless communication unit 142 (for example, a communication unit using Bluetooth (registered trademark), a telephone network communication unit 143 (for example, a communication unit using LTE, 4G, 5G), a vibrator 150, a sensor group 160, and a timer 170, which are connected to each other via a bus 106.

The sensor group 160 includes a GPS 161, a gyro sensor 162, a geomagnetic sensor 163, an acceleration sensor 164, the illuminance sensor 165, a proximity sensor 166, a distance sensor 167, and a line-of-sight detection sensor 168.

The operation button 130 is a member for a content viewer to perform an input operation, such as buttons provided on a side surface and the front surface of the housing 108.

Figure 4:
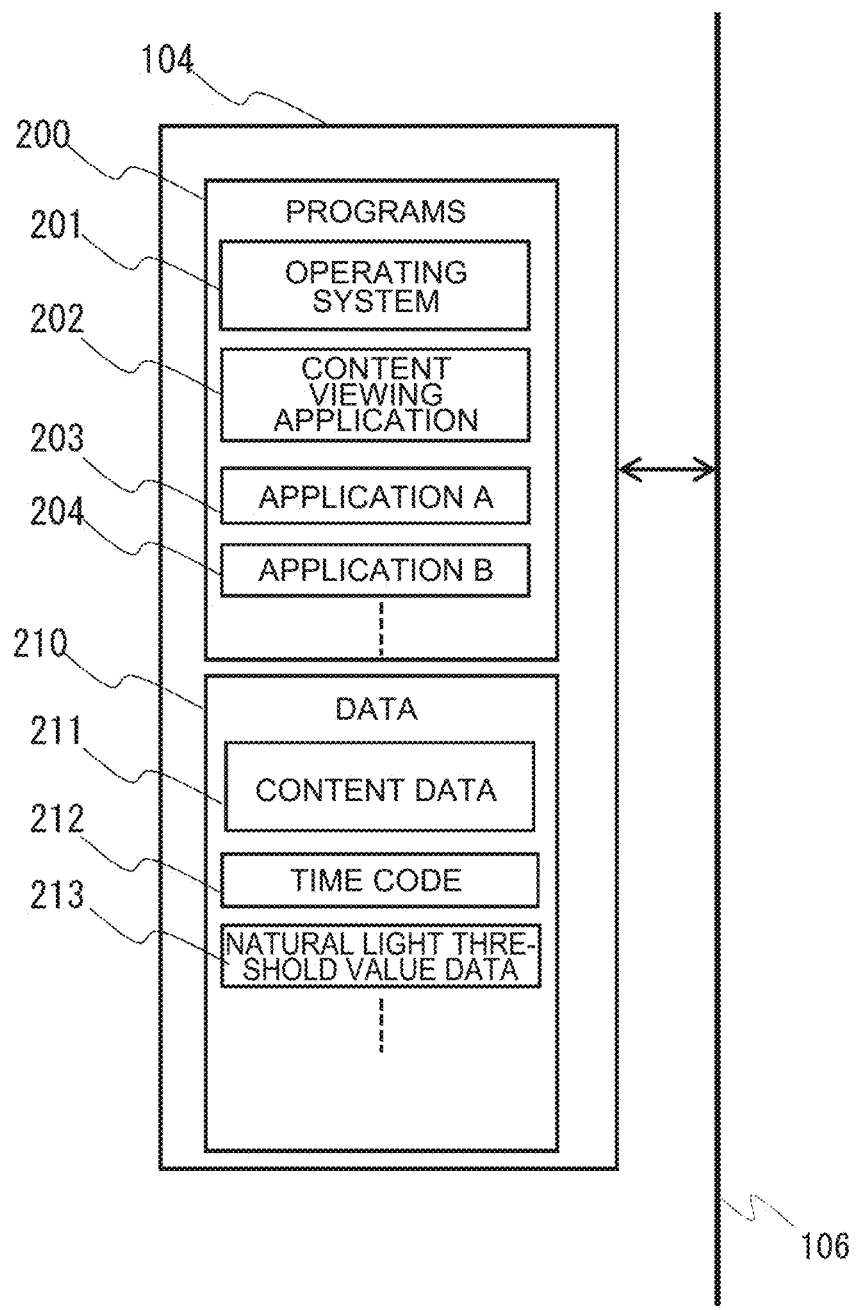
FIG. 4 is a block diagram of a program loaded in a RAM.

FIG. 4 is a block diagram illustrating programs loaded in the RAM 104.

The programs 200 and data 210 necessary to execute the programs 200 are loaded into the RAM 104.

The programs 200 include an operating system 201 necessary to execute a basic operation of the smartphone 100, and a content viewing application 202 as at least one or more application programs to be executed in the smartphone 100. In addition, as examples of an application different from the content viewing application 202, an application A203 and an application B204 may be provided.

The data 210 includes content data 211 to be played, a time code 212, and natural light threshold value data 213 of natural light. The content data 211 may be a package (that is, content data including all data from beginning to end of content to be viewed). When the content is to be streamed and distributed, the content data 211 is buffer data of data to be streamed. The description will be made on the premise that, when the streaming distribution is to be performed, data necessary for re-viewing (replaying) in a content viewing process described later is buffered. However, for example, when the processor 101 determines that the data is returned to data 10 seconds before and replayed, the content data is not returned to the data 10 seconds before, and the content data buffered is replayed from a data part at the earliest time (for example 8 seconds before).

Figure 5:
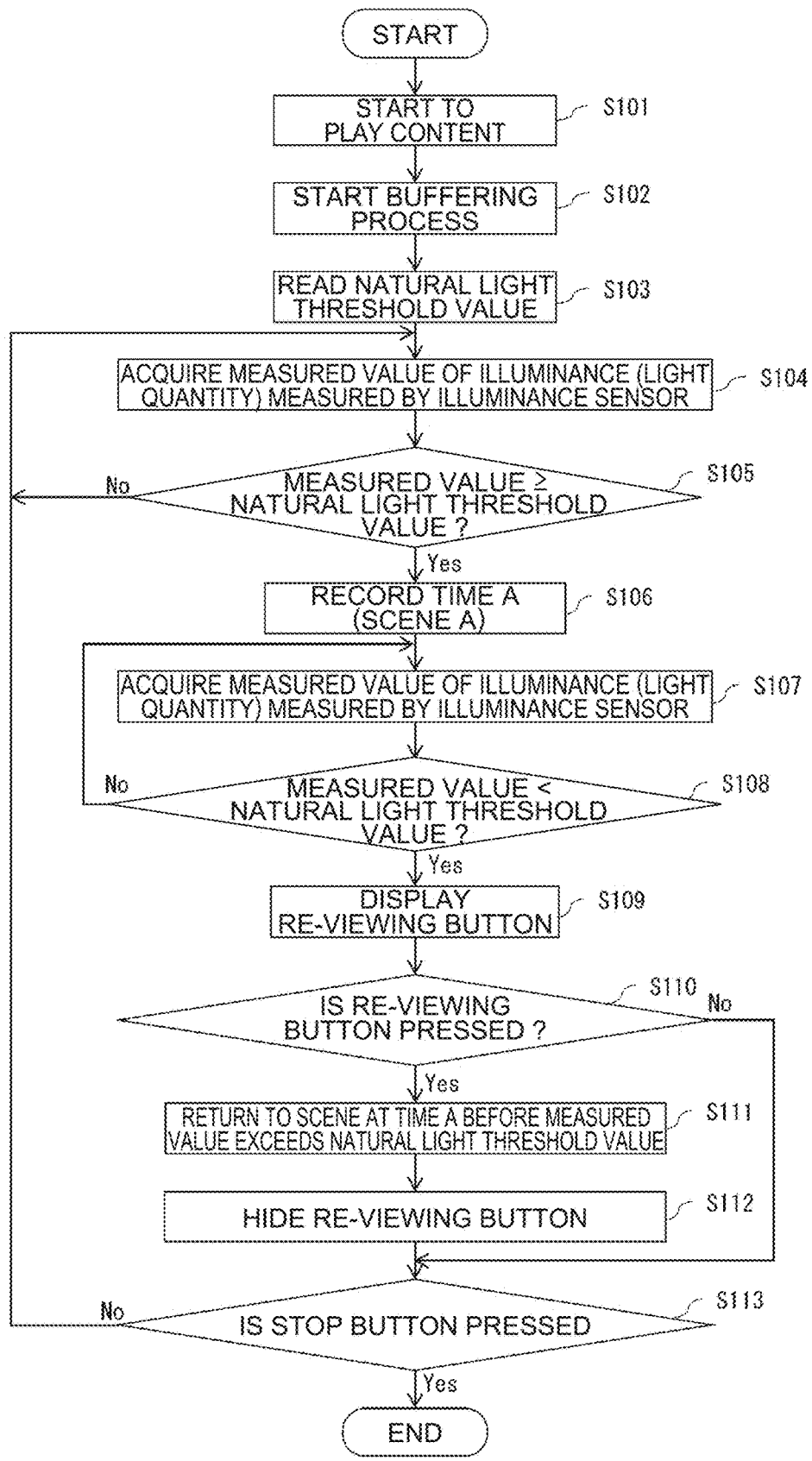
FIG. 5 is a flowchart illustrating an overview of a content viewing process to be executed by the smartphone.
Figure 6:
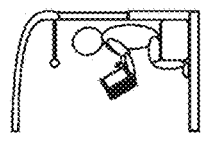
FIG. 6 is a diagram illustrating the order in which content is played.

A basic flow of a content viewing method using the mobile content viewing device according to the present embodiment is described with reference to FIGS. 5, 6, and 7. FIG. 5 is a flowchart illustrating an overview of the content viewing process to be executed by the smartphone 100. FIGS. 6 and 7 are diagrams illustrating the order in which the content is played.

When the processor 101 starts to play the content (S101), the processor 101 associates the content data with the reproduction time and records the association between the content data and the reproduction time in the buffer memory (RAM 104) (S102).

As a natural light countermeasure process, the processor 101 reads the natural light threshold value data 213 from the RAM 104 (S103), acquires a measured value of illuminance (light quantity) measured by the illuminance sensor 165 (S104), and compares the measured value with the natural light threshold value (S105). The natural light threshold value is used to determine whether a viewing inhibition event has occurred.

When the processor 101 determines that the measured value is less than the natural light threshold value (S105: No), the process returns to step S104 and the processor 101 continues the reproduction of the content. In FIGS. 6 and 7, the time corresponds to a time t1 and a viewer on a train views a scene 1.

When the processor 101 determines that the measured value is equal to or greater than the natural light threshold value (S105: Yes), the processor 101 records the time of the determination (S106). In FIGS. 6 and 7, the time corresponds to a time t2.

When the measured value is equal to or greater than the natural light threshold value, it can be estimated that the viewer is inhibited from viewing the content displayed on the display 102. Therefore, the processor 101 records, as information identifying the time when the measured value is equal to or greater than the natural light threshold value, the time t2 or data (sequence number) identifying a scene 2 of the content displayed at the time t2, and continues the reproduction of the content.

While continuing the reproduction of the content, the processor 101 acquires a measured value of illuminance from the illuminance sensor 165 again (S107) and compares the measured value with the natural light threshold value (S108).

When the processor 101 determines that the measured value is equal to or greater than the natural light threshold value (S108: No), the processor 101 continues the reproduction of the content and continues the acquisition of a measured value and the comparison of the measured value with the natural light threshold value (S107, S108). In FIGS. 6 and 7, the time corresponds to a time t3.

When the processor 101 determines that the measured value is less than the natural light threshold value (S108: Yes), the processor 101 displays a re-viewing button (replay button) 220 for returning the played content to a past time point when the measured value is less than the natural light threshold value, the time t2 in the above-described example (S109).

When the viewer of the content does not press the re-viewing button 220 (S110: No), the processor 101 continues the reproduction of the content and causes the process to proceed to step S113. In this case, as illustrated in FIG. 6, a scene 5 and a scene 6 are played after a scene 4 at t4.

When the viewer of the content presses the re-viewing button 220 (S110: Yes), the processor 101 returns the content to the scene 2 at the time t2 when the measured value is determined to be equal to or greater than the natural light threshold value, and the content is replayed from the scene 2 (S111). Then, the processor 101 hides the re-viewing button 220 (S112).

When the processor 101 does not detect that a stop button for stopping the content is pressed (S13: No), the processor 101 causes the process to return to step S104 and continues the reproduction of the content.

When the stop button for stopping the content is pressed (S113: Yes), the content viewing process ends.

[Setting Example of Natural Light Threshold Value]

Figure 8:
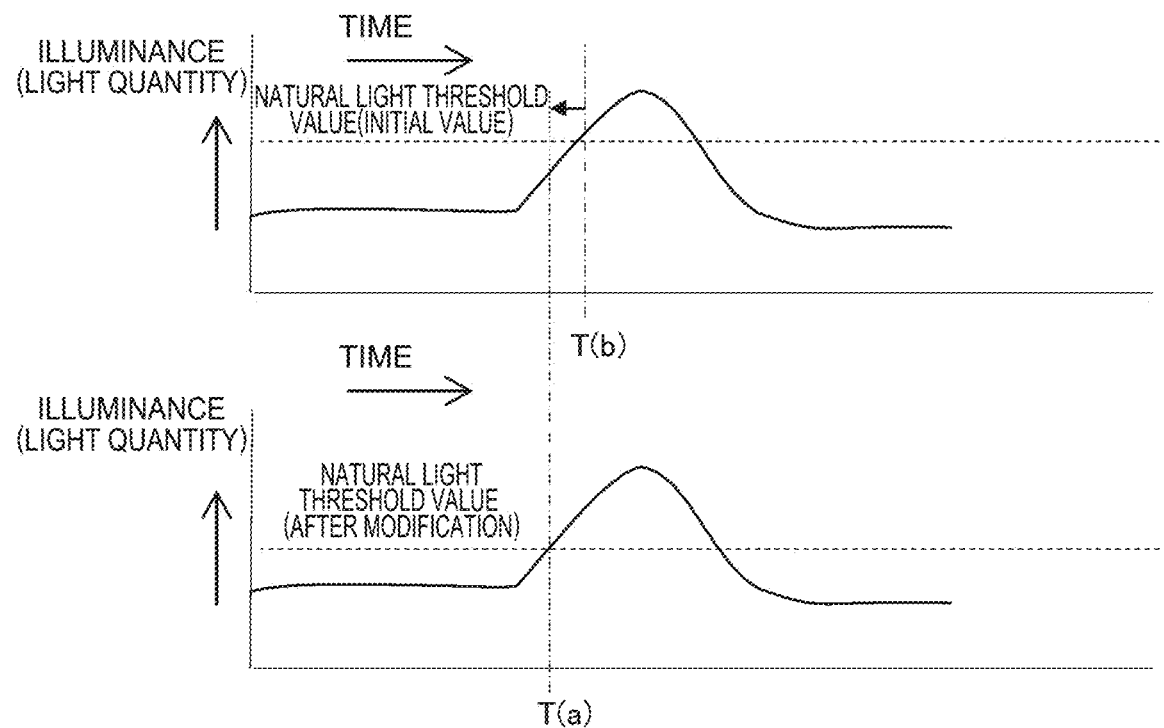
FIG. 8 is a diagram illustrating a setting example of a natural light threshold value.

FIG. 8 is a diagram illustrating a setting example of the natural light threshold value.

The natural light threshold value may be an absolute value or a fixed value or may be changed by the user as appropriate.

In addition, the processor 101 may perform learning to determine the natural light threshold value based on a user's behavior according to a result of a past determination by the processor 101. For example, the processor 101 uses an initial set value of the natural light threshold value to execute step S103 and determines that viewing is inhibited at a time T(b) as a result of the execution of step S103. In this case, the processor 101 performed replaying from the time T(b).

However, when the user performs a replay operation of returning to a time T(a) during replaying from the time T(b), a light quantity at the time T(a) may be set as a new natural light threshold value (after modification).

Figure 9:
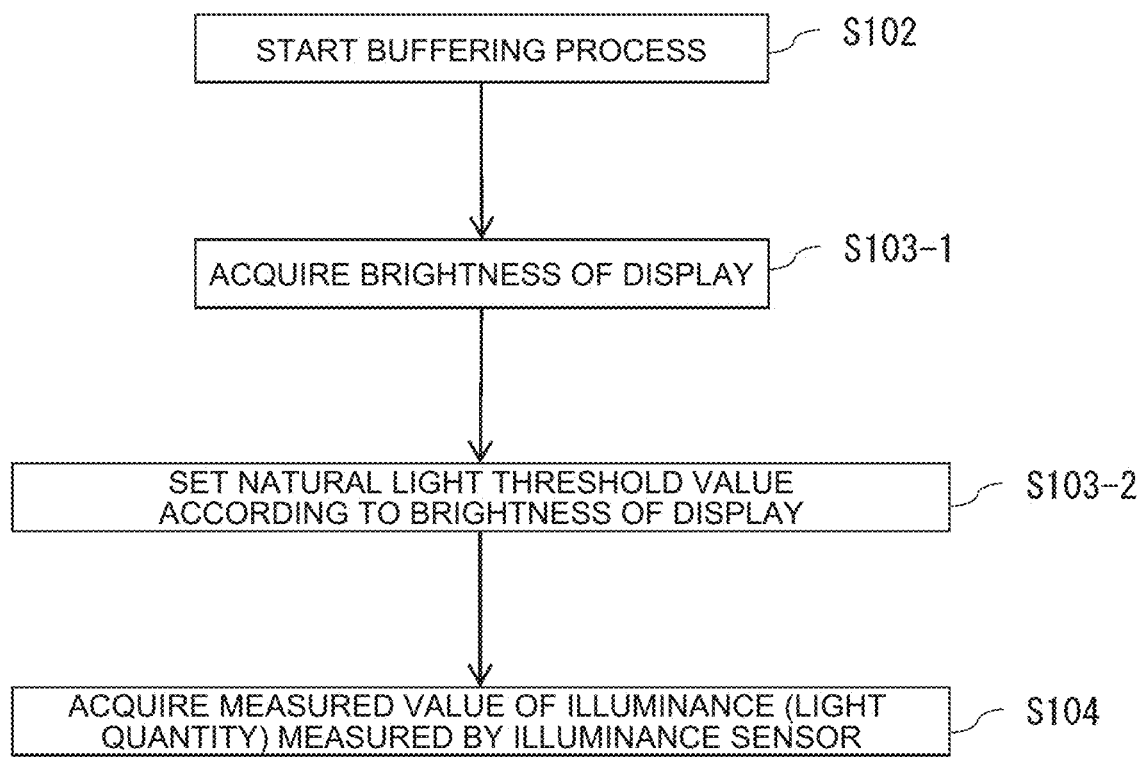
FIG. 9 is a flowchart illustrating a process of setting the natural light threshold value.
Figure 10:
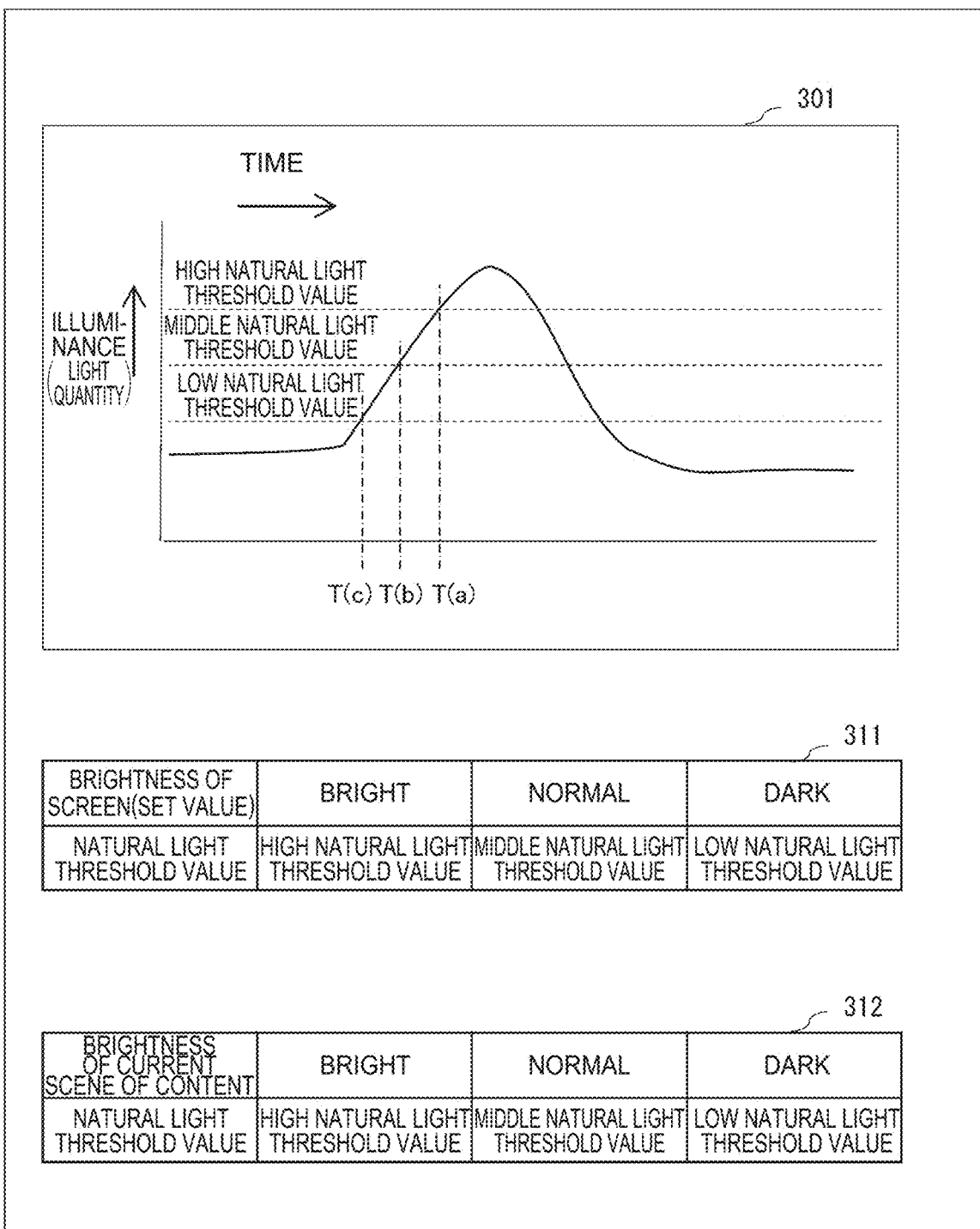
FIG. 10 is a diagram illustrating an example of the natural light threshold value.

FIG. 9 is a flowchart illustrating a process of setting the natural light threshold value. FIG. 10 is a diagram illustrating an example of the natural light threshold value.

The processor 101 may read the brightness (set brightness value of the display 102) of the screen of the smartphone 100 (S103-1), and set the natural light threshold value according to the brightness of the screen (S103-2). When the brightness of the screen is a fixed value, the natural light threshold value is fixed.

In addition, when the processor 101 changes the brightness of the screen according to the quantity of the natural light, the processor 101 changes the natural light threshold value according to the brightness of the screen at that time. In this example, in FIG. 5, No is determined in step S105 and No is determined in step S113 to cause the process to return to step S103 instead of step S104 to read the natural light threshold value at any time.

In addition, the brightness of the screen also changes according to the brightness of the content being played. Therefore, the processor 101 may change the natural light threshold value according to the brightness of a current scene of the content being played.

As illustrated in FIG. 10, table data 311 and 312 defining 3 levels, a high natural light threshold value, a middle natural light threshold value, and a low natural light threshold value according to the brightness of the screen or the brightness of the content may be prepared in the storage 105 and loaded as the natural light threshold value data 213. The value increases in order of the low natural light threshold value, the middle natural light threshold value, and the high natural light threshold value. Therefore, as indicated by a graph 301, in a time zone in which the natural light gradually increases in amount, times when the measured value exceeds the low natural light threshold value, the middle natural light threshold value, and the high natural light threshold value are T(c), T(b), and T(a), respectively.

[Process of Determining Occurrence of Viewing Inhibition Event Using Elapsed Time Threshold Value Tth]

Figure 11:
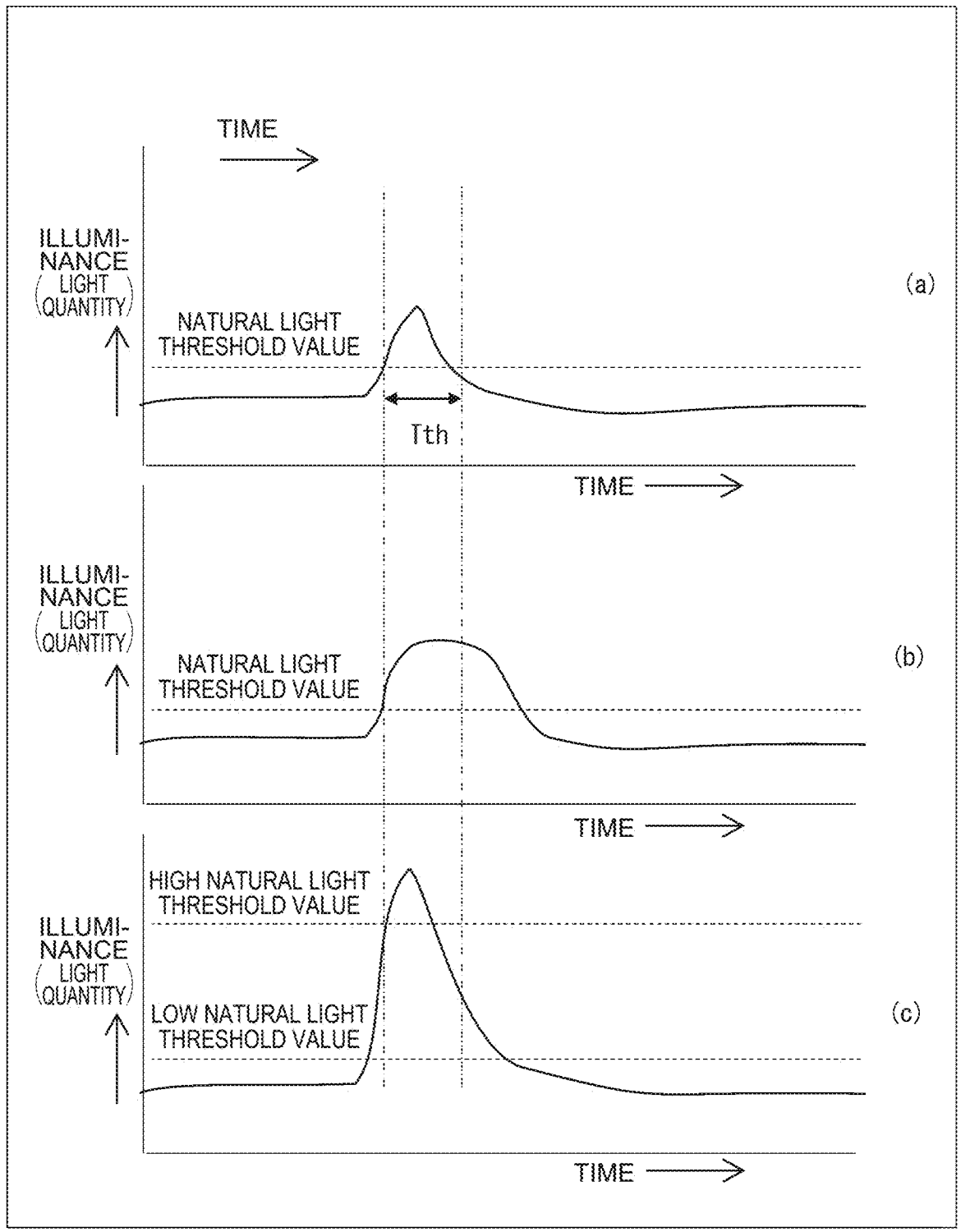
FIG. 11 are diagrams illustrating a case where it is determined that a measured value exceeds the natural light threshold value.

FIG. 11 are diagrams illustrating a case where it is determined that a measured value exceeds the natural light threshold value. As illustrated in FIG. 11(a), the processor 101 measures a time T elapsed from the time when the measured value exceeds the low natural light threshold value. When the elapsed time T is less than a predetermined elapsed time threshold value Tth (FIG. 11(a)), an event in which the current measured value exceeds the natural light threshold value is not determined to be a viewing inhibition event. When the elapsed time T is equal to or greater than the elapsed time threshold value Tth, it is determined that a viewing inhibition event has occurred (FIG. 11(b)).

Figure 12A:
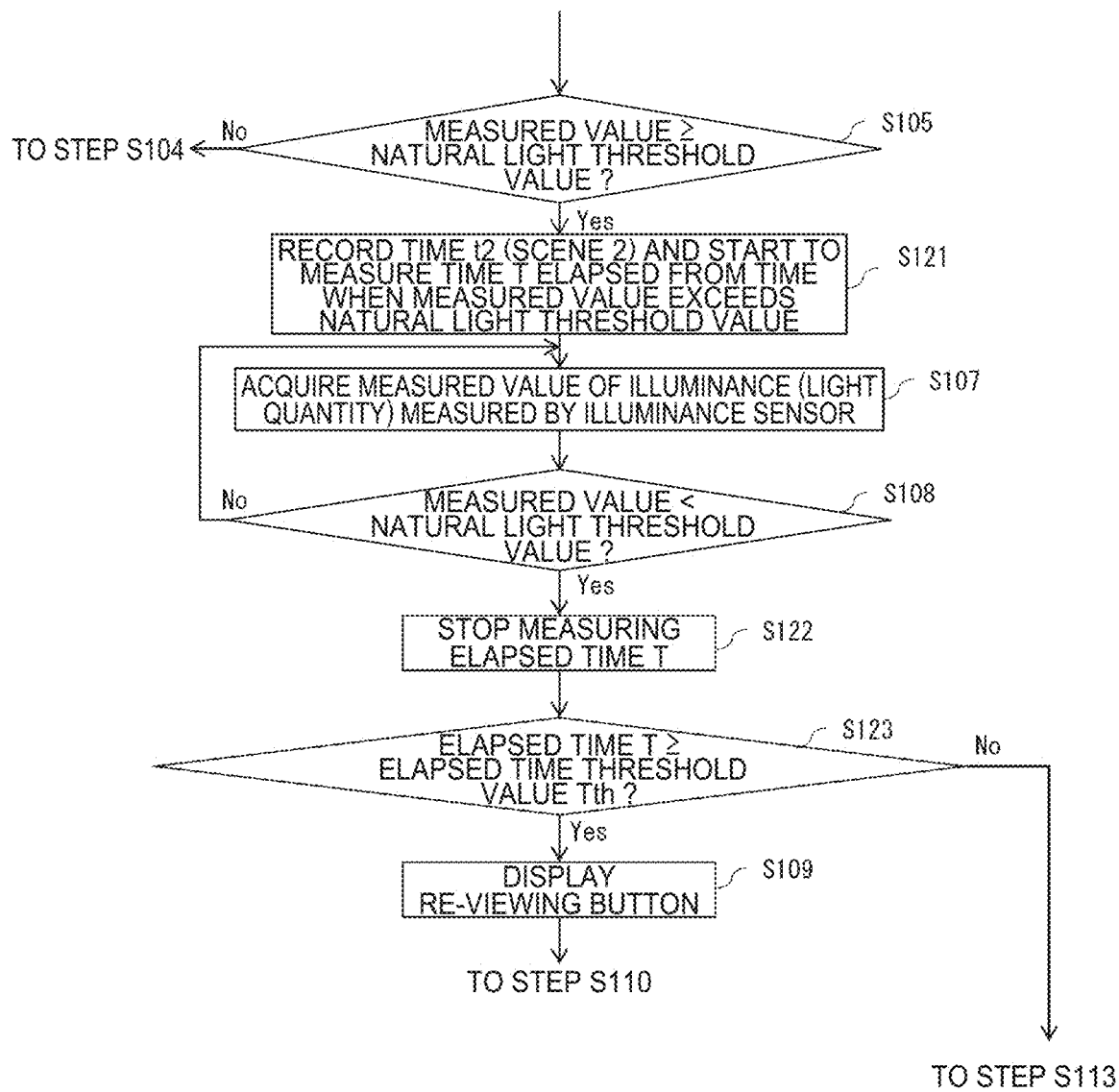
FIG. 12A is a flowchart illustrating the flow of a process of determining the occurrence of a viewing inhibition event illustrated in FIGS. 11(a) and 11(b).

FIG. 12A is a flowchart illustrating the flow of a process of determining the occurrence of a viewing inhibition event illustrated in FIGS. 11(a) and 11(b). Since processes of the flowchart of FIG. 12A are the same as the processes of steps S101 to S105 illustrated in FIG. 5, FIG. 12A illustrates the flowchart from step S105 for convenience of explanation.

When the measured value is equal to or greater than the natural light threshold value (S105: Yes), the processor 101 records the time t2 (or information identifying the scene 2) and starts to measure a time T elapsed from the time when the measured value becomes greater than the natural light threshold value (S121).

A new measured value is acquired (S107). When the new measured value is equal to or greater than the natural light threshold value (S108: No), the process returns to step S107 and the measurement of the elapsed time T when the measured value is equal to or greater than the natural light threshold value is continued.

When the new measured value is less than the natural light threshold value (S108: Yes), the processor 101 stops measuring the elapsed time T (S122) and compares the elapsed time T with the elapsed time threshold value Tth (S123).

When the elapsed time T is less than the elapsed time threshold value Tth (S123: No), an event in which the measured value exceeds the natural light threshold value is not a viewing inhibition event and thus the process proceeds to step S113. When the elapsed time T is equal to or greater than the elapsed time threshold value Tth (S123: Yes), an event in which the measured value exceeds the natural light threshold value is determined to be a viewing inhibition event, and the re-viewing button 220 is displayed (S109). Thereafter, the subsequent steps are the same as those of the process illustrated in FIG. 5 and thus a description thereof is omitted.

Figure 12B:
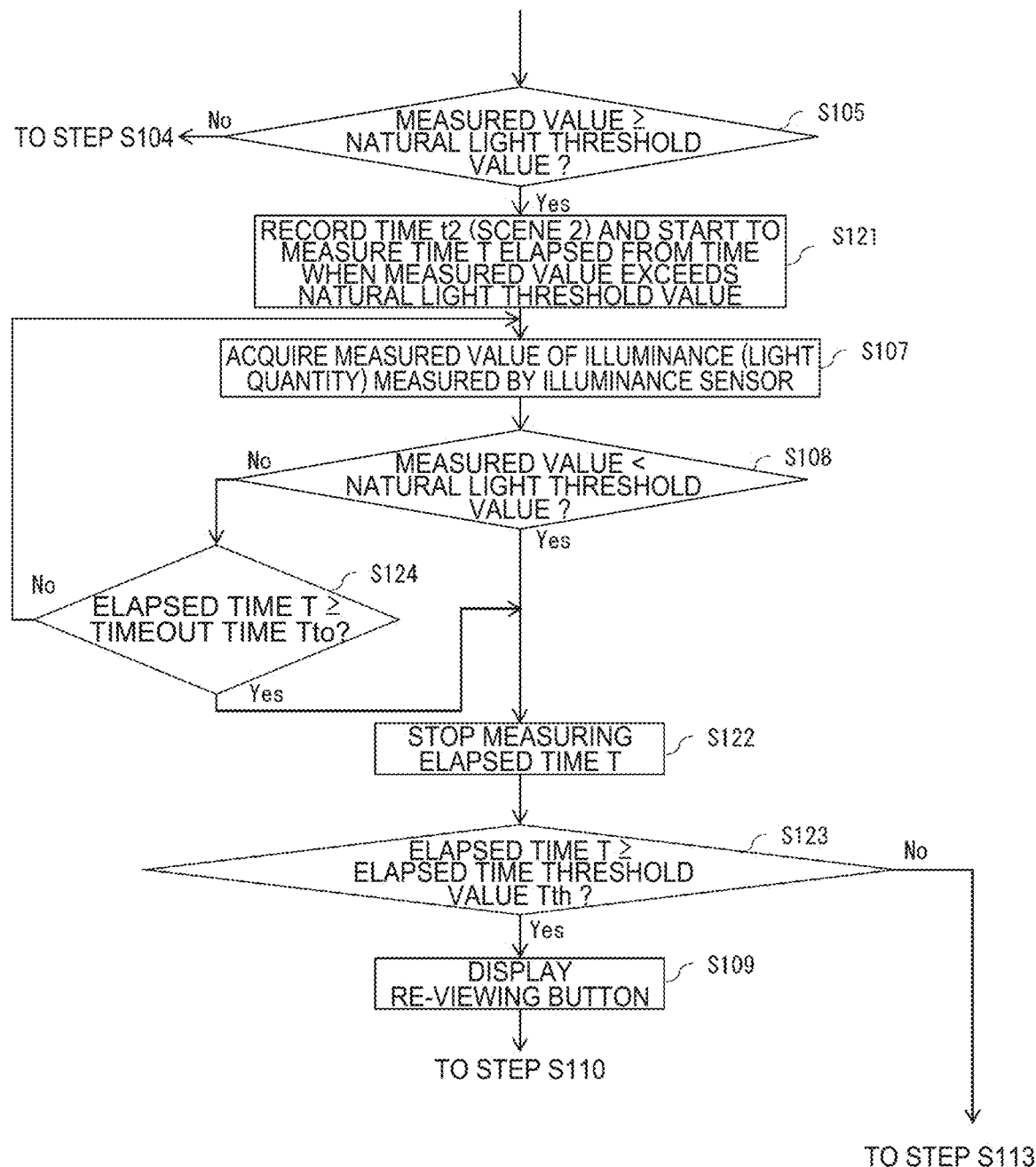
FIG. 12B is a flowchart illustrating the flow of a modification of the process of determining the occurrence of a viewing inhibition event illustrated in FIG. 12A.

FIG. 12B is a flowchart illustrating the flow of a modification of the process of determining the occurrence of a viewing inhibition event illustrated in FIG. 12A.

When it is determined that the new measured value is less than the natural light threshold value (S108: Yes) in step S108, the measurement of the elapsed time T is stopped (S122). When the new measured value is equal to or greater than the natural light threshold value (S108: No) in step S108 and the elapsed time T is less than a timeout time Tto (S124: No), the process returns to step S107. When the elapsed time T is equal to or greater than the timeout Tto (S124: Yes), a state in which the measured value is equal to or greater than the natural light threshold value continues for Tto or longer, and the measurement of the elapsed time T is stopped (S122). Note that the timeout time Tto≥the elapsed time threshold value Tth.

After the measurement of the elapsed time T is stopped (S122), when the elapsed time T is equal to or greater than the elapsed time threshold value Tth (S123: Yes), the measured value continuously exceeds the natural light threshold value for the elapsed time threshold value Th or longer, it is determined that a viewing inhibition event has occurred, the re-viewing button 220 is displayed, and the measurement of the elapsed time T is stopped (S109).

On the other hand, when the elapsed time T is less than the elapsed time threshold value Tth (S123: No), a viewing inhibition event does not currently occur and the process proceeds to step S113.

In addition, as a modification of the process of determining the occurrence of a viewing inhibition event using the elapsed time threshold value Tth, as illustrated in FIG. 11(c), the processor 101 uses the low natural light threshold value and the high natural light threshold value greater than the low natural light threshold value. Even in a case where a time period for which the measured value exceeds the low natural light threshold value is less than the elapsed time threshold value Tth, when the measured value exceeds the high natural light threshold value, the light quantity is large, the viewer may get dizzy, and thus it is determined that it is the cause of the inhibition.

Figure 13:
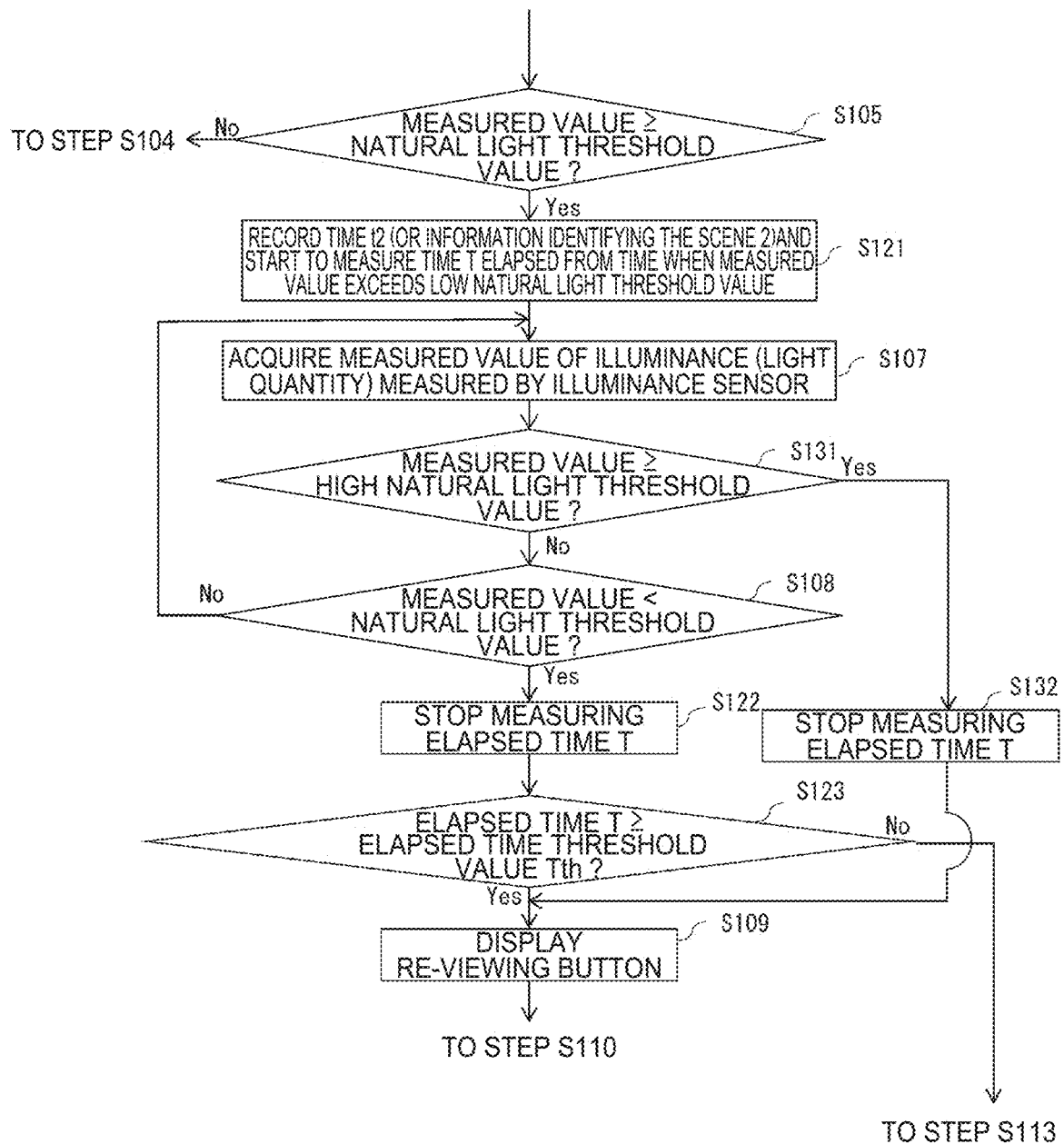
FIG. 13 is a flowchart illustrating the flow of the process of determining the occurrence of a viewing inhibition event illustrated in FIG. 11(c).

FIG. 13 is a flowchart illustrating the flow of the process of determining the occurrence of a viewing inhibition event illustrated in FIG. 11(c). Similarly to FIGS. 12, since processes of the flowchart of FIG. 13 are the same as the processes of steps S101 to S105 illustrated in FIG. 5, FIG. 13 illustrates the flowchart from step S105 for convenience of explanation.

When the measured value is equal to or greater than the low natural threshold value (S105: Yes), the processor 101 records the time t2 (or information identifying the scene 2) and starts to measure a time T elapsed from the time when the measured value exceeds the low natural threshold value (S121).

A new measured value is acquired (S107). When the new measured value is equal to or greater than the high natural light threshold value (S131: Yes), it is regarded as a viewing inhibition event regardless of the elapsed time T. Then, the processor 101 stops measuring the elapsed time T (S132) and causes the process to proceed to displaying (S109) of the re-viewing button.

In a state in which the new measured value is equal to or greater than the low natural light threshold value and less than the high natural light threshold value (S108: No), the process returns to step S107, and the measured value and the high natural light threshold value are compared with each other (S131).

When the new measured value becomes less than the low natural light threshold value from the state in which the new measured value is equal to or greater than the low natural light threshold value and less than the high natural light threshold value (S108: Yes), the processor 101 stops measuring the elapsed time T (S122), and compares the elapsed time T with the elapsed time threshold value Tth (S123). Thereafter, the subsequent steps are the same as those of the process illustrated in FIG. 5 and thus a description thereof is omitted.

[Process of Determining Occurrence of Viewing Inhibition Event Using Amount of Change in Natural Light]

Figure 14:
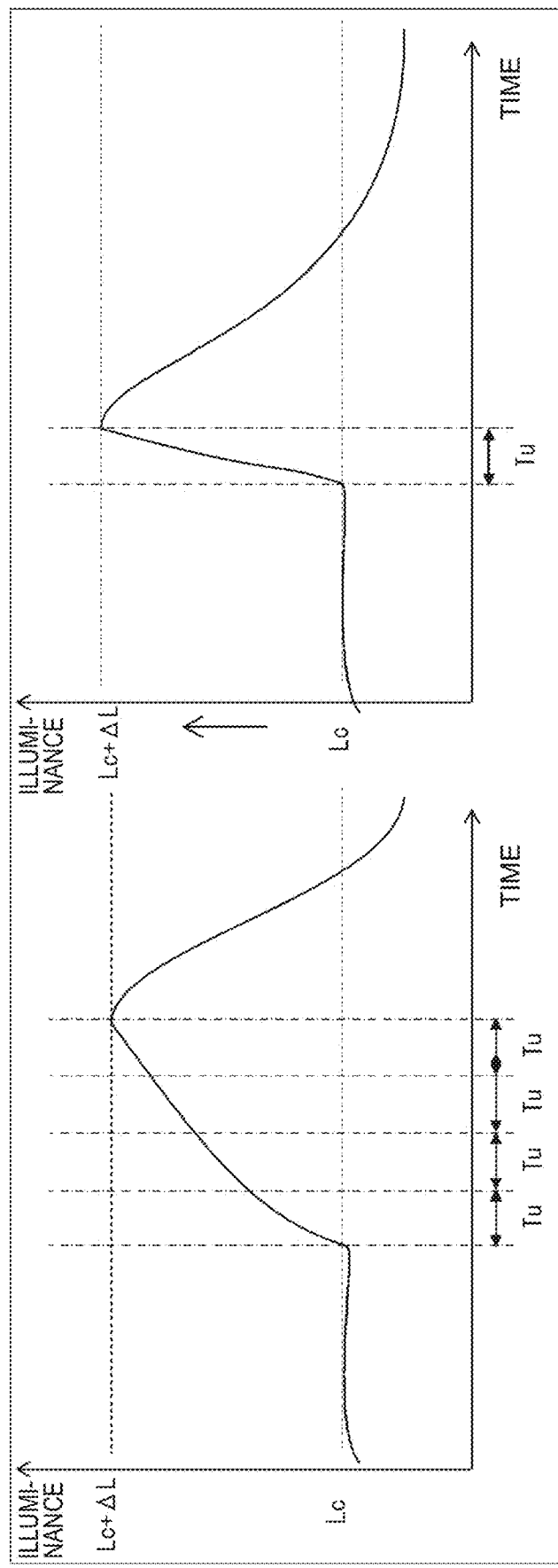
FIG. 14 is a diagram illustrating an example of a process of determining the occurrence of a viewing inhibition event using the amount of a change in natural light.

When the quantity of natural light rapidly increases based on the current quantity of natural light (in a case where light adaptation does not follow), it may be determined to be the cause of the inhibition. FIG. 14 is a diagram illustrating an example of the process of determining the occurrence of a viewing inhibition event using the amount of a change in natural light.

As illustrated in FIG. 14, the processor 101 measures a time elapsed to the time when it reaches a natural light threshold value Lc+ΔL obtained by adding a predetermined fixed value ΔL of the quantity of light to the current illuminance Lc as a reference. That is, this example is an example in which the natural light threshold value is set as a dynamic value based on the measured value. When the time elapsed to the time when the measured value reaches the natural light threshold value is less than a predetermined fixed time period Tu, it is determined that a viewing inhibition event has occurred. When the time elapsed to the time when the measured value reaches the natural light threshold value is equal to or greater than Tu, for example, n times (n=4 in FIG. 14), the light adaptation follows and it may be determined that the viewer can visually recognize the screen.

Figure 15:
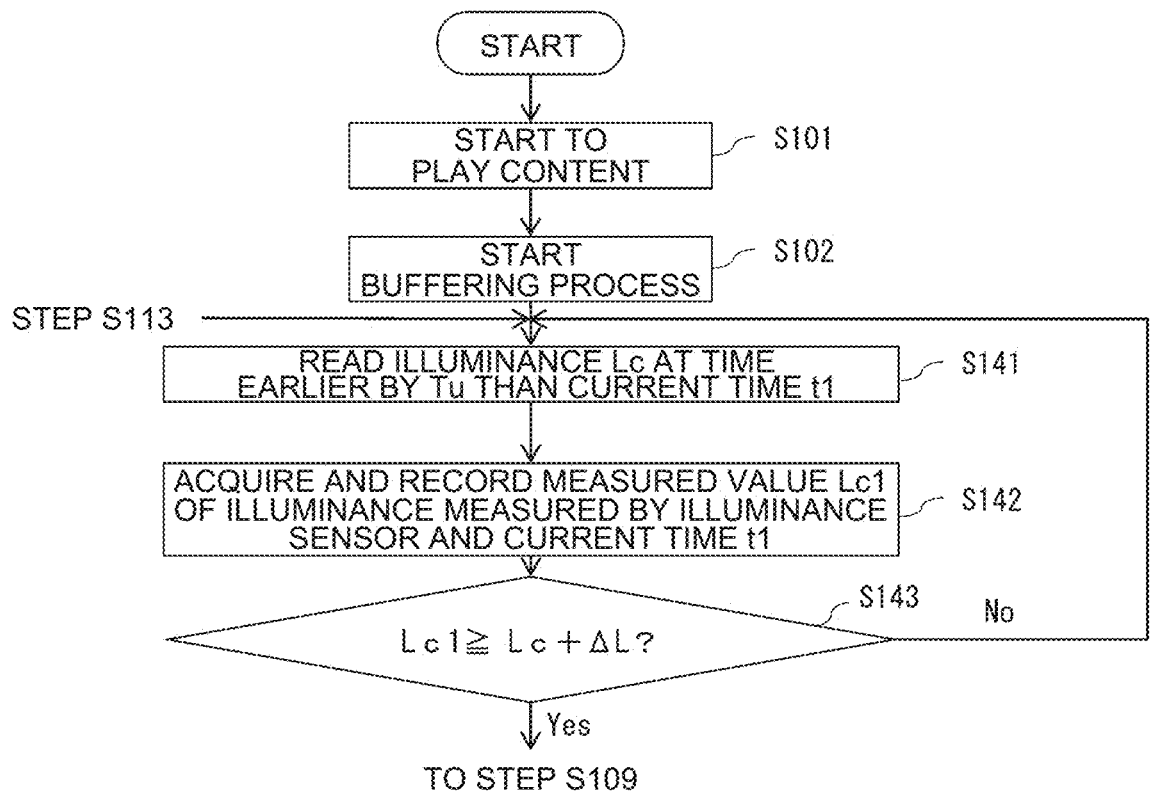
FIG. 15 is a flowchart illustrating the flow of the process of determining the occurrence of a viewing inhibition event illustrated in FIG. 14.

FIG. 15 is a flowchart illustrating the flow of the process of determining the occurrence of a viewing inhibition event illustrated in FIG. 14. In FIG. 15, it is assumed that the fixed time period Tu is equal to a sampling time interval of the illuminance sensor 165 for convenience of explanation. That is, it is assumed that when the illuminance sensor 165 performs sensor output once every second, the fixed time period Tu is 1 second.

After the processor 101 starts to play the content (S101) and starts a buffering process (S102), the processor 101 reads illuminance Lc at a time earlier by the fixed time period Tu than the current time t1 (S141). Since the fixed time period Tu is equal to the sampling time interval, the measured value Lc1 at the current time t1 is a reference, and the illuminance Lc at a time earlier by the fixed time period Tu is a measured value at a time earlier by one sampling time interval than the current time t1, that is, illuminance measured in the most recent past.

The processor 101 acquires and records the measured value Lc1 of the illuminance measured by the illuminance sensor 165 and the current time t1 (S142).

When the processor 101 determines that the current illuminance Lc1 is equal to or greater than the natural light threshold value Lc (measured value at a time earlier by one sampling time interval than t1)+ΔL (S143: Yes), the processor 101 displays the re-viewing button to suggest a process of re-viewing the content (S109).

When the current illuminance Lc1 is less than the natural light threshold value Lc+ΔL (S143: No), the processor 101 causes the process to return to step S141. Thereafter, illuminance Tu at a time earlier by Tu than the time t2 (t2 is the time later by one sampling time interval of the illuminance sensor 165 than the time t1), that is, the natural light threshold value based on Lc1 is set.

In FIG. 15, the fixed time period Tu is equal to the sampling time interval, but may be different from the sampling time interval. For example, when the fixed time period Tu is shorter than the sampling time interval, a past sampling point before the time when the measured value becomes equal to or greater than the natural light threshold value+ΔL is complemented to calculate an illuminance change function and calculate a derivative. Therefore, even when the fixed time period Tu is a very short time period (time period shorter than the sampling time interval), this example can be applied. On the other hand, when the fixed time period Tu is longer than the sampling time interval, this example can be applied by calculating an increase rate of a plurality of sampling points before the time when the measured value becomes equal to or greater than the natural light threshold value Lc+ΔL.

Figure 16:
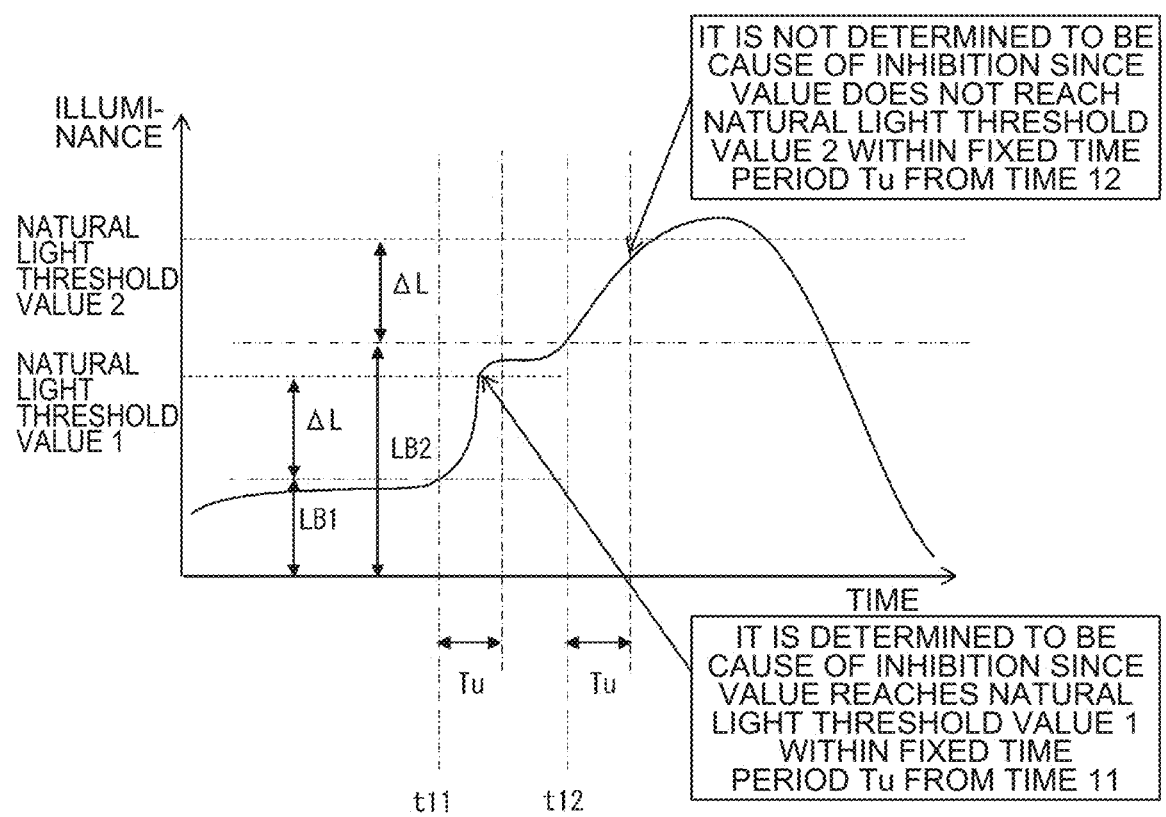
FIG. 16 is a diagram illustrating an example of the process of determining the occurrence of a viewing inhibition event illustrated in FIG. 14.

FIG. 16 is a diagram illustrating another example of the process of determining the occurrence of a viewing inhibition event using the amount of a change in natural light. Also in this example, a dynamic light natural threshold value is used. The configuration of the smartphone 100 used in this example is the same as the configuration described with reference to FIGS. 1 to 4.

The natural light threshold value is defined as illuminance (LBx) changing over time+a fixed value (ΔL). When the measured value is less than the natural light threshold value within the fixed time period Tu determined in advance from the illuminance changing over time, it is determined that a viewing inhibition event does not occur. This is synonymous with the determination of whether a rate of increase in illuminance is a fixed value or higher. In addition, a natural light threshold value degree for determination of inhibition may be defined as an average value (low frequency component of illuminance) of illuminance for the most recent fixed time period+a fixed value.

In the example illustrated in FIG. 16, the processor 101 defines LB1+ΔL obtained by adding the fixed value ΔL to the measured value LB1 of the illuminance sensor 165 at a time t11 as a natural light threshold value 1 for a time period from the time t11 to the time t11+Tu. Then, when the measured value exceeds LB1+ΔL in the time period from the time t11 to the time t11+Tu, the processor 101 determines that a viewing inhibition event has occurred.

The processor 101 defines LB2+ΔL obtained by adding the fixed value ΔL to a measured value LB2 of the illuminance sensor 165 at a time t12 as a natural light threshold value 2 for a time period from the time t12 to the time t12+Tu. Then, when the measured value does not exceed the LB2+ΔL in the time period from the time t12 to the time t12+Tu, the processor 101 does not determine that a viewing inhibition event has occurred.

In the example illustrated in FIGS. 14 to 16, it is determined whether it is the cause of the inhibition using the rate of increase in illuminance, and thus there is a case where even when an absolute value of illuminance is small as indicated by the time t11 in FIG. 16, it is the cause of the inhibition, and there is also a case where even when an absolute value of illuminance is large as indicated by the time t12 in FIG. 16, it is not the cause of the inhibition.

[Timing of Displaying Re-Viewing Button]

Figure 17:
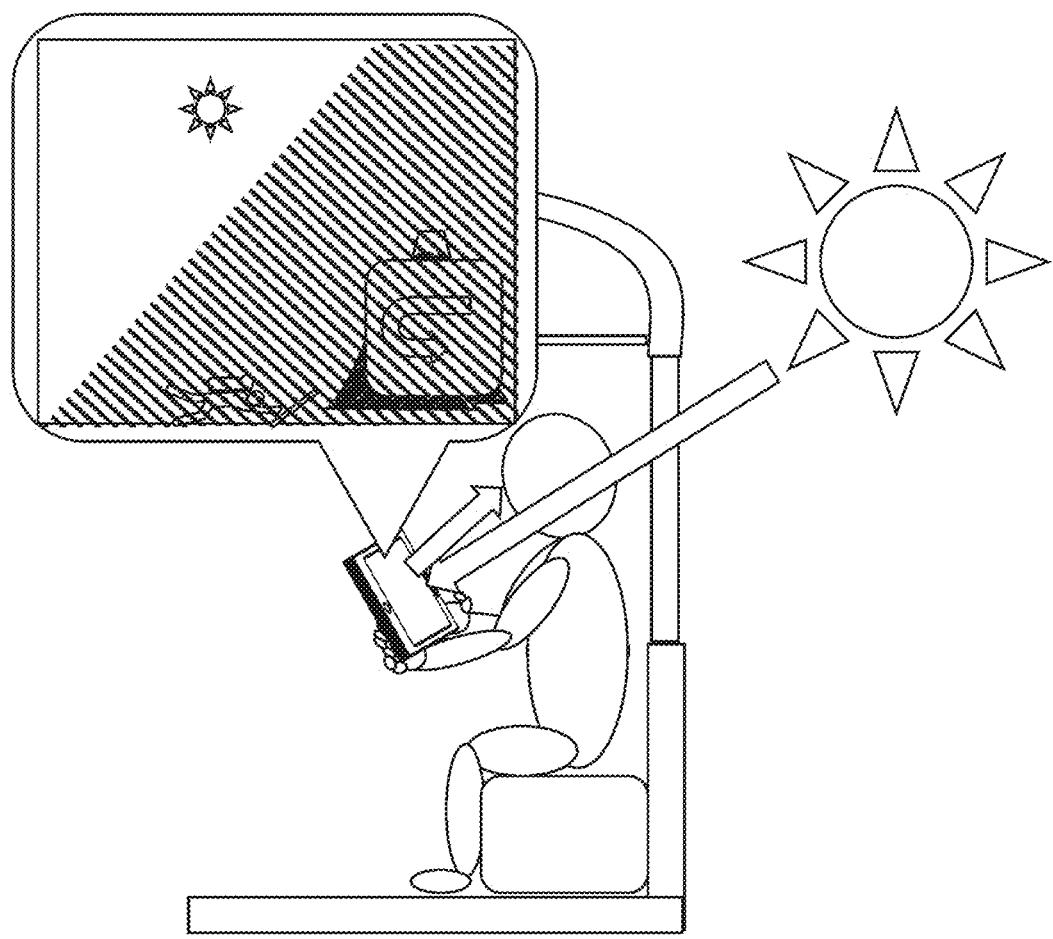
FIG. 17 is a diagram illustrating an example of a timing of displaying a re-viewing button.

FIG. 17 is a diagram illustrating an example of the timing of displaying the re-viewing button. In the above description, when the measured value becomes less than the natural light threshold value, the re-viewing button 220 is displayed (step S109 illustrated in FIG. 5). However, as another example, when the processor 101 determines that the measured value is equal to or greater than the natural light threshold value (S105: Yes), the processor 101 may immediately display the re-viewing button 220 (see FIG. 17). In this case, steps S107 and S109 are not executed.

[Example of Screen Display]

Figure 18:
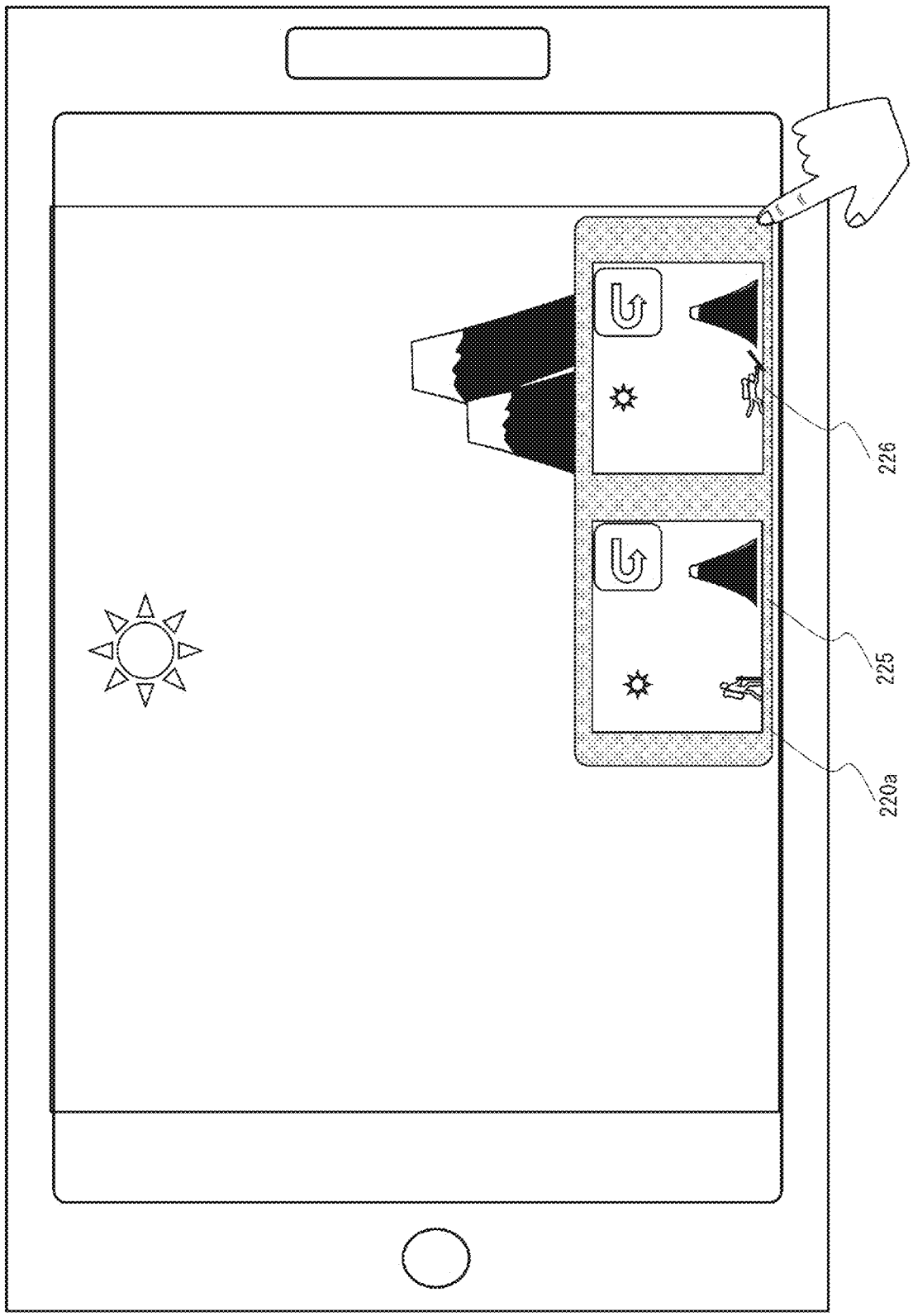
FIG. 18 is a diagram illustrating a display example of the re-viewing button.
Figure 19:
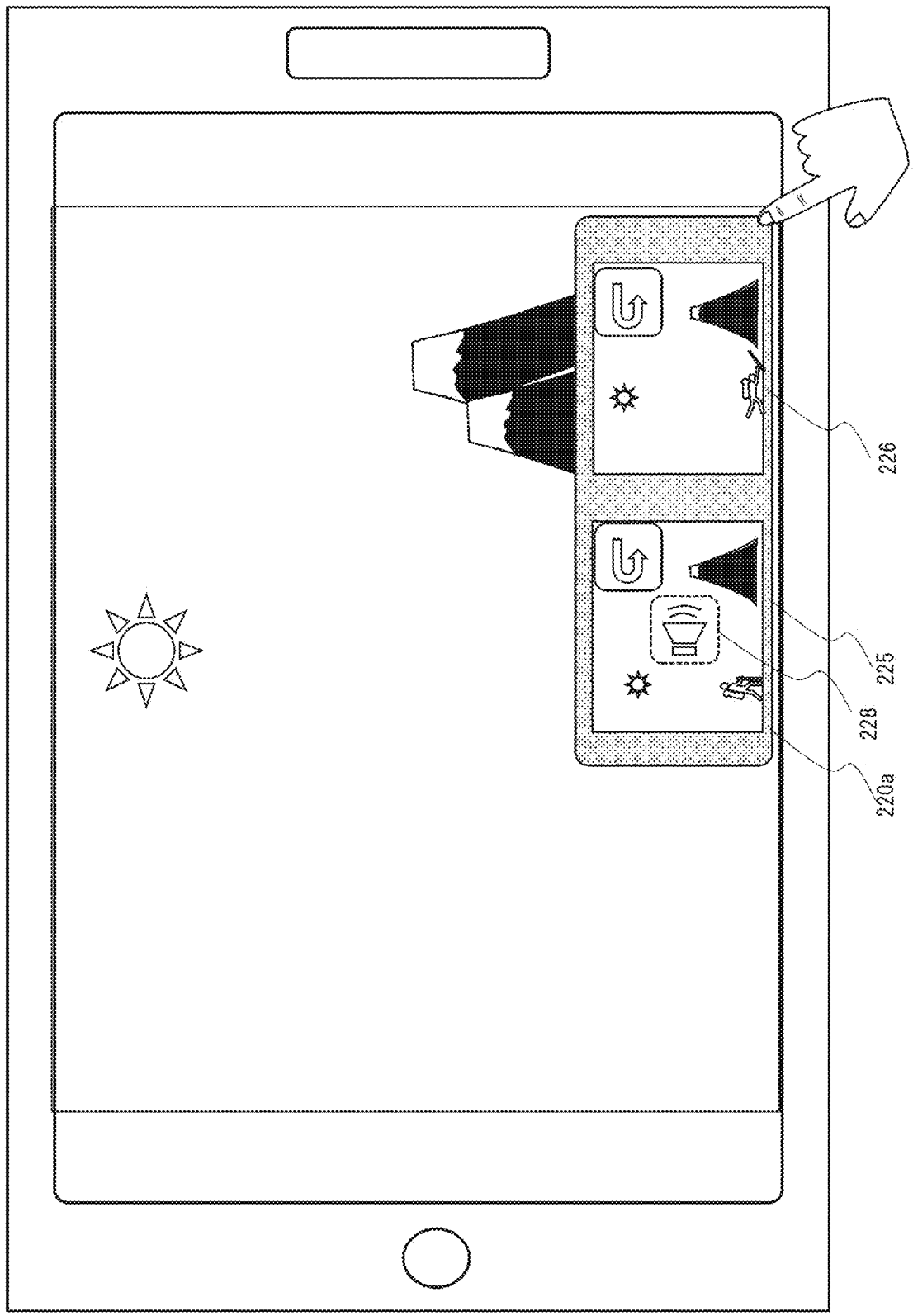
FIG. 19 is a diagram illustrating a display example of the re-viewing button.

FIGS. 18 and 19 are diagrams illustrating display examples of the re-viewing button. As illustrated in FIG. 18, a re-viewing button 220a is used to display a plurality of thumbnail video images 225 and 226 indicating candidate replay scenes. Therefore, the viewer can select a replay scene.

The thumbnail video image 225 is a thumbnail video image starting from a scene (hereinafter referred to as "default scene") at the time when it is detected that the measured value becomes equal to or greater than the natural light threshold value, that is, a thumbnail video image starting from the scene recorded in step S106 illustrated in FIG. 5. The other thumbnail video image 226 displayed in a plurality is a thumbnail video image starting before or after the default scene.

The processor 101 performs reproduction from a scene where replay is started in each of the thumbnail video images. The processor 101 plays only the video images without outputting audio of the thumbnail video images while the processor 101 outputs, from the speaker 122, audio of the content being played on the display 102.

Alternatively, when the re-viewing button 220 (see FIG. 6) is pressed, the processor 101 may display the plurality of thumbnail video images 225 and 226 that start being played from the replay scenes. The processor 101 may stop the reproduction of the content being played or stop outputting only the audio, and output audio of a video image in the thumbnail video image 225 or the thumbnail video image 226. When the processor 101 plays the video images of the plurality of thumbnail video images 225 and 226, the processor 101 basically stops outputting the audio. As another example, the processor 101 may output audio of a default thumbnail video image.

When the viewer touches the thumbnail video image 225 or the thumbnail video image 226 on the touch panel 107, the audio may be played. In this case, as illustrated in FIG. 19, an audio mark 228 is displayed on the thumbnail video image 225 for which the audio is played. In this case, when the viewer keeps a finger, which has touched the touch panel for the audio reproduction, on the touch panel and performs a swipe operation or the like to determine a selected scene in the operation of the second action, it is easy to use.

In a case where the selected scene is determined in the operation of the second action, when the thumbnail video image progresses from the initial selected scene, the thumbnail video image may be returned to and played from the selected scene or may be played from a subsequent scene to which the reproduction is progressed by the touch.

Instead of the touch on the touch panel 107, the operation of selecting the thumbnail video image may be an operation in which the in-camera 111 captures an image of the face of the viewer and the line-of-sight detection sensor 168 detects the line of sight, and the processor 101 may play the audio of the thumbnail video image 225 or 226 toward which the line of sight is directed.

[Redesignation of Replay Scene]

Figure 20:
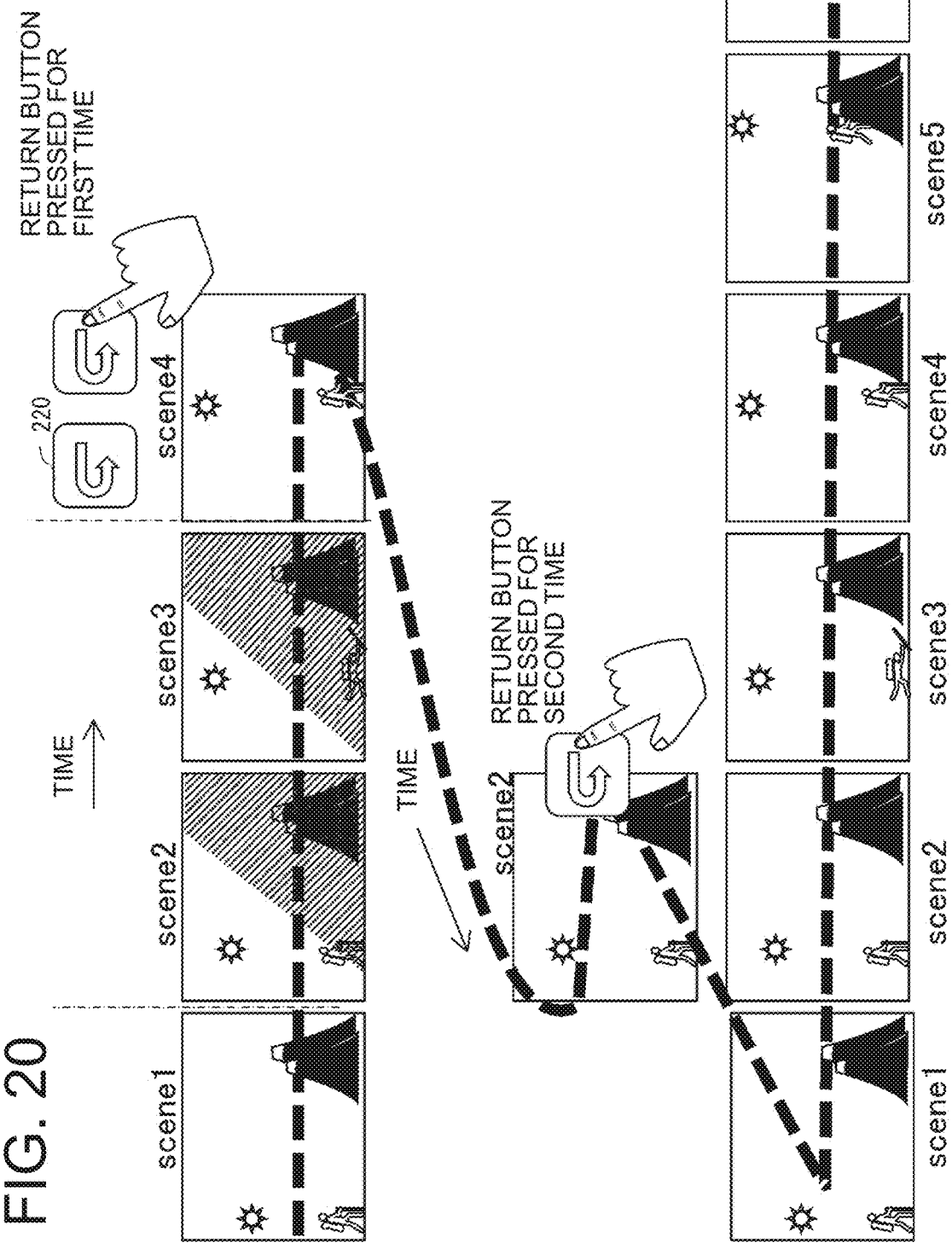
FIG. 20 is a diagram illustrating an example in which the re-viewing button is pressed twice.

FIG. 20 is a diagram illustrating an example in which the re-viewing button 220 is pressed twice.

In a situation in which the quantity of natural light increases, when the illuminance sensor 165 or the like detects that the quantity (illuminance) of ambient light exceeds the threshold value (step S105 illustrated in FIG. 5: Yes), the processor 101 records a content reproduction position at that time as a default scene (step S106 illustrated in FIG. 5). Next, the fact that the content can be played back is presented to the user (for example, the re-viewing button 220 is displayed on the screen) (step S109 illustrated in FIG. 5). When a user instruction (for example, button pressing for the first time) is provided, the content starts to be played from the default scene (step S111 illustrated in FIG. 5). After that, when a user instruction (for example, button pressing for the second time) is provided, the content is replayed from a scene before the default scene, the scene 1 in the case of FIG. 20 (step S111 illustrated in FIG. 5).

The scene started to be replayed by double pressing is a well-separated time before the default scene (scene 2) as a reference, for example, a change of a scene, the beginning of a dialogue, or the like.

As a modification illustrated in FIG. 20, the second pressing is activated even after the reproduction is progressed a little by the first pressing. For example, in a case where replay is performed by the first pressing but the content is hardly grasped, the viewer may want to return the content to a well-separated part, for example, a well-separated scene by pressing once more (double pressing) within a fixed time period from the first pressing.

When the processor 101 detects the pressing of the re-viewing button 220 or 220a (step S110: Yes), the processor 101 starts the timer 170 to start to measure a time elapsed after the pressing, that is, a time elapsed from the detection of the pressing of the re-viewing button 220. When the time elapsed after the pressing is determined in advance and the re-viewing button is not pressed for the second time before the elapse of the time elapsed after the pressing, the processor 101 hides the re-viewing button 220, stops the timer 170, and changes the display 102 to full screen display. When the re-viewing button is pressed for the second time before the elapse of the time elapsed after the pressing, a thumbnail video image to be played from a scene before the default scene is displayed. After an operation of pressing the re-viewing button for the second time, the re-viewing button may be kept displayed for a fixed time period in a similar manner and a pressing operation may be accepted again. Alternatively, the re-viewing button may be hidden and the display may be shifted to the full screen display.

[Display Example of Re-Viewing Button 220]

Figure 21:
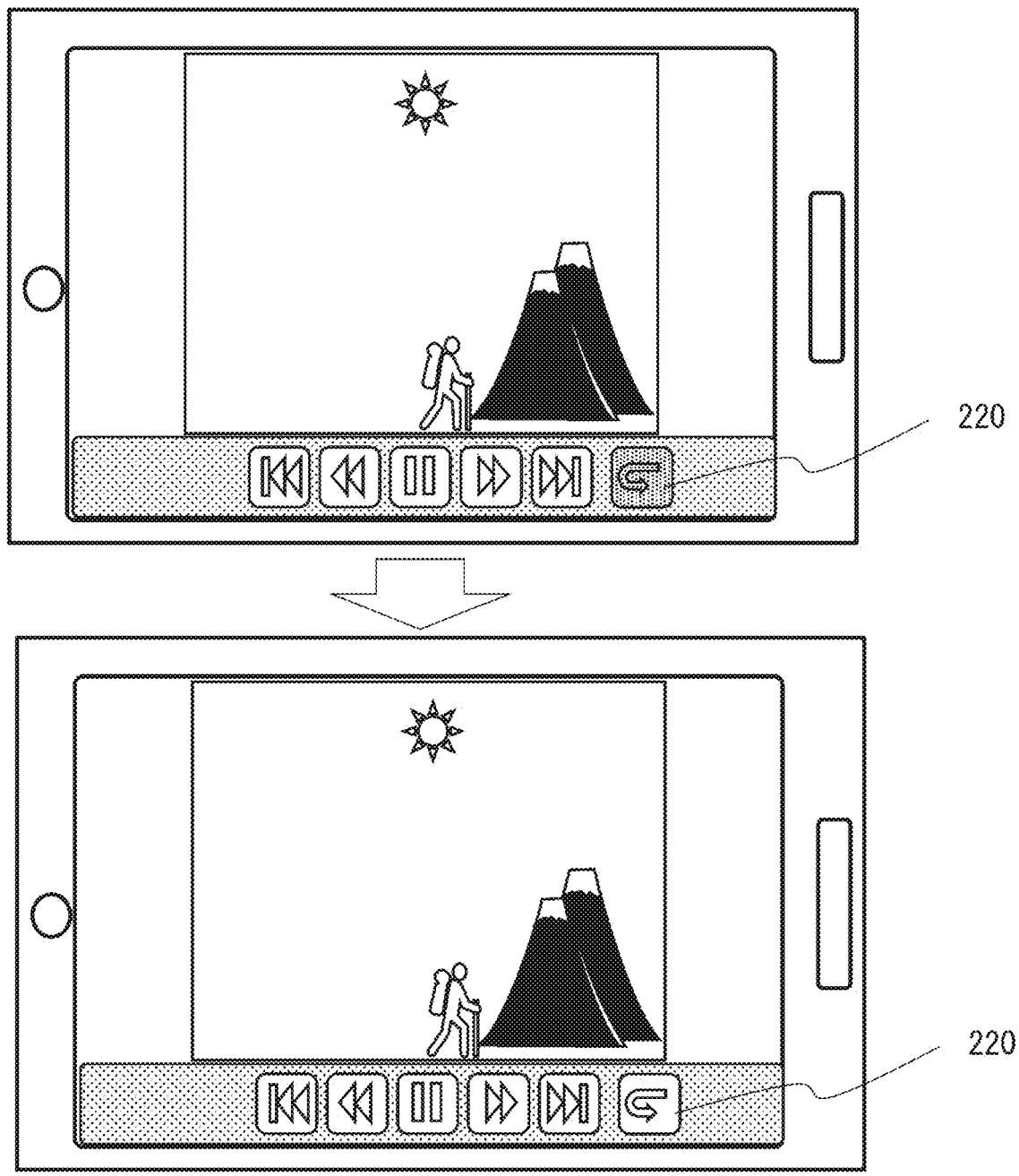
FIG. 21 is a diagram illustrating a display example of the re-viewing button.
Figure 22:
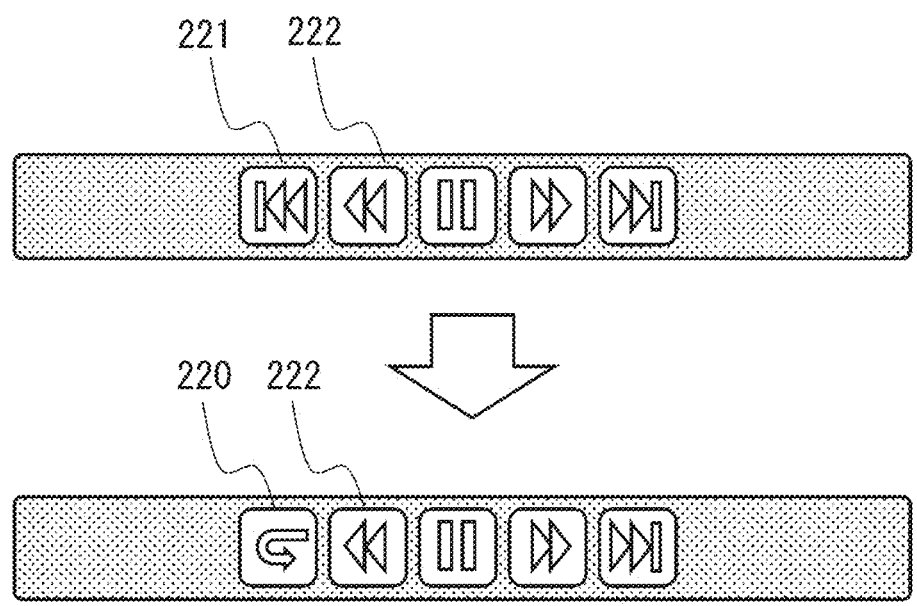
FIG. 22 is a diagram illustrating a display example of the re-viewing button.

FIGS. 21 and 22 are diagrams illustrating display examples of the re-viewing button 220. When the processor 101 displays the re-viewing button 220 such that the re-viewing button 220 is disactivated, for example, grays out and displays the re-viewing button 220 (see FIG. 21(a)), and determines that a viewing inhibition event has occurred, the processor 101 changes the re-viewing button 220 to activated display (see FIG. 21(b)) and activates the re-viewing button 220 so that the re-viewing button 220 can be operated.

In addition, the re-viewing button 220 may be used together with a fast-backward button 221 and a return button 222, and may function as the re-viewing button 220 only when the measured value exceeds the natural light threshold value. The fast-backward button 221 is, for example, a button for returning in units of 10 seconds or a button for returning at n times speed. For example, as illustrated in FIGS. 23, when the fast-backward button 221 is displayed in the screen of the display 102, and the processor 101 determines that the measured value exceeds the natural light threshold value, the processor 101 may display another button having a similar function, for example, the re-viewing button 220 at the display position of the fast-backward button 221, instead of the fast-backward button 221.

In the above description, the "re-viewing button 220" is displayed to provide a suggestion for replay to the viewer due to the occurrence of a viewing inhibition event. However, audio may be output and input to indicate that a viewing inhibition event has occurred and indicate whether a replay operation is required. In addition, the input of the replay operation may be performed with a gesture obtained by the processor 101 analyzing video data captured by the in-camera 111 or with a sound (voice) collected by the microphone 121.

[Example of Measurement of Quantity of Ambient Light]

Figure 23:
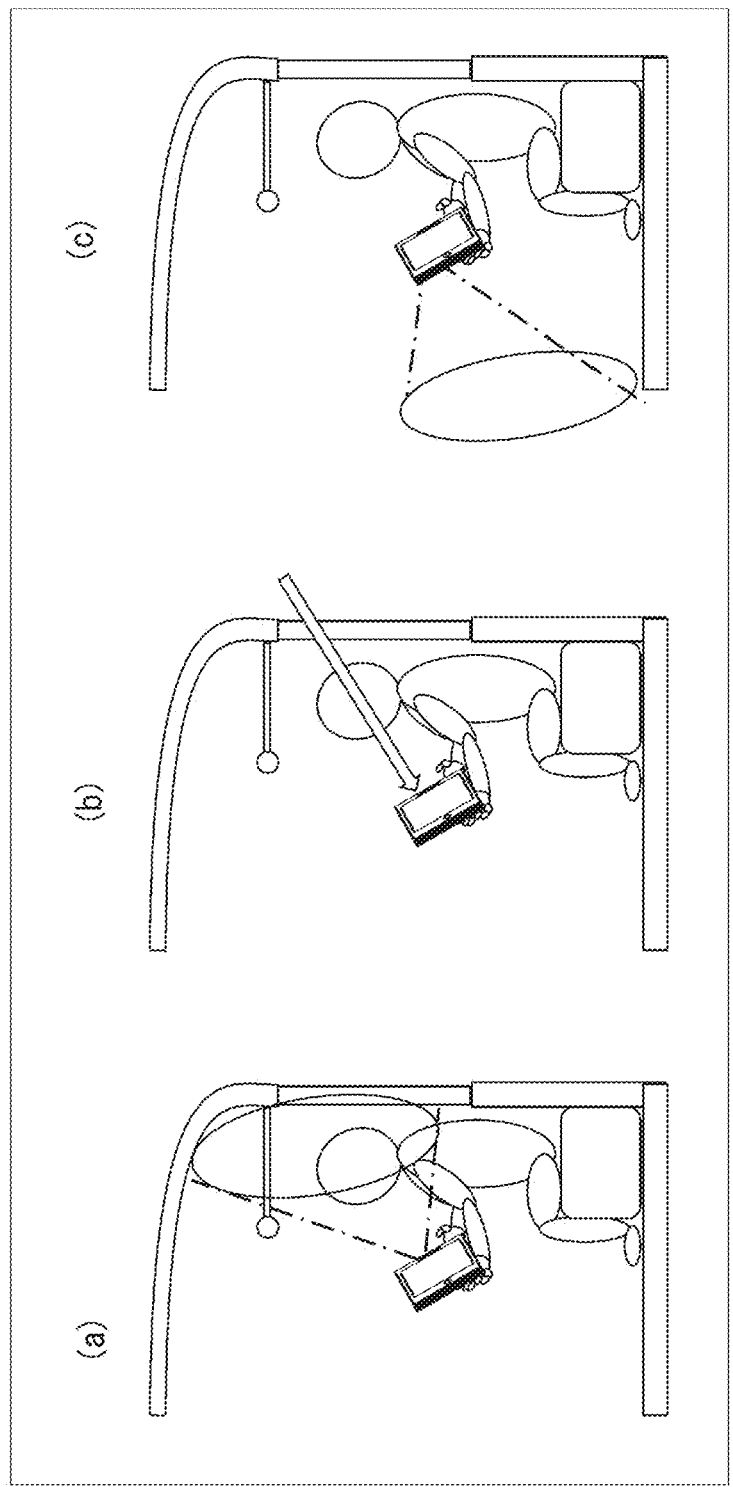
FIG. 23 are diagrams illustrating an example of measurement of the quantity of ambient light, (a) illustrating an example in which the quantity of ambient light is measured based on an image captured by an in-camera, (b) illustrating an example in which measurement is performed with the quantity of light incident on the in-camera, and (c) illustrating an example in which the quantity of light is measured by an out-camera.

FIG. 23 are diagrams illustrating an example of measurement of the quantity of ambient light.

In the above description, the illuminance sensor 165 is used to measure the quantity of ambient light around the smartphone 100. However, the quantity (average) of the ambient light captured by the in-camera 111 instead of the illuminance sensor 165 may be measured (see FIG. 23(a)). In FIG. 23(a), the processor 101 measures the quantity of the ambient light from a luminance value of an image captured by the in-camera 111. The processor 101 compares a value obtained by calculating statistical amounts (average value, median value, mode value, maximum value, and total value) of luminance values of pixels constituting the image with the natural light threshold value determined in advance.

In addition, the processor 101 uses the in-camera 111 to capture an image of the face of the viewer and performs, based on the image, processing of recognizing the face and processing of detecting the irises. When the processor 101 determines that the irises cannot be recognized from a facial expression with half-closed eyes, the processor 101 may determine that the quantity of the ambient light is equal to or greater than the natural light threshold value.

When the quantity of the ambient light is measured based on the image from the in-camera 111, the in-camera 111 captures an image facing the surface of the display. Therefore, the quantity of light that hits the surface opposite to light that hits the display 102 is detected. Therefore, a surface (window glass or the like) through which light is transmitted or an opening part (open window or the like) is detected by image analysis from the image captured by the in-camera 111, and the quantity (illuminance) of light from behind the user is detected from the brightness of an image of the part (see FIG. 23(b)). Therefore, it is possible to measure light in the same direction as light that hits the screen of the display 102.

In addition, as another example, the processor 101 may determine the quantity of light according to a change in the brightness of an object around it based on an image captured by the out-camera 112 (see FIG. 23(c)). Also, in an example in which the quantity of ambient light is measured using the image captured by the out-camera 112, it is possible to measure light in the same direction as light that hits the screen of the display 102.

According to the present embodiment, in a case where content is viewed using the mobile content viewing device, for example, the smartphone 100, even when the viewing is inhibited by natural light, the content can be returned to a scene inhibited by the natural light or a scene before and after the scene and can be viewed.

In addition, in a case where, even when a measured value of natural light exceeds the natural light threshold value, it is determined that it corresponds to a viewing inhibition event only when a time period for which the measured value exceeds the natural light threshold value is equal to or greater than the elapsed time threshold value, it is not determined that the viewing is inhibited by only momentary incidence of strong natural light. Therefore, like a situation in which the viewer views content while riding a vehicle, even in a situation in which natural light momentarily becomes strong as the viewer moves, it is possible to suggest re-viewing to the viewer only when the re-viewing is required.

When the setting of the natural light threshold value is changed according to the viewer's preference, a past operation, the brightness of the display 102, or natural light, it is possible to accurately determine whether a viewing inhibition event has occurred according to the viewer or a surrounding situation.

In addition, by using a thumbnail video image starting from a replay start scene of the content for the layout of the re-viewing button 220, the viewer can intuitively grasp where to replay the content from.

In addition, the re-viewing button 220 is used together with the other buttons. Therefore, while the screen size of the display 102 is limited, re-viewing can be suggested to the viewer without the re-viewing button 220 limiting the display region of the content.

Each of the embodiments described above does not limit the present invention and includes various modifications without departing from the gist of the present invention, and these modifications belong to the technical scope of the present invention. For example, each of the embodiments described above may be arbitrarily combined with any of the other embodiments.

In addition, although the present embodiment describes the smartphone 100 as an example of the mobile content viewing device, a transmissive or semi-transmissive head-mounted display that is affected by natural light may be used as the mobile content viewing device.

In addition, the mobile content viewing device may be a rear seat monitor or a front seat monitor of a vehicle. Power is supplied to the rear seat monitor or the front seat monitor from a battery of the vehicle. Therefore, the rear seat monitor or the front seat monitor has sufficient power and thus is suitable for measurement of the quantity of ambient light with the in-camera 111 and the out-camera 112.

In addition, in the present embodiment, an event in which the quantity of ambient light becomes equal to or greater than the natural light threshold value is a viewing inhibition event. However, the cause of inhibition such as sudden braking of a vehicle may be determined as a viewing inhibition event in combination with the quantity of ambient light. In this case, when either the determination that the quantity of ambient light is equal to or greater than the natural light threshold value or the determination that another viewing inhibition event has occurred is established, the processor 101 suggests re-viewing.

LIST OF REFERENCE SIGNS

100: Smartphone
101: Processor
102: Display
103: ROM
104: RAM
105: Storage
106: Bus
107: Touch panel
108: Housing
111: In-camera
112: Out-camera
121: Microphone
122: Speaker
130: Operation button
141: Wireless LAN communication unit
142: Proximity wireless communication unit 143: Telephone network communication unit
150: Vibrator
160: Sensor group
161: GPS
162: Gyro sensor
163: Geomagnetic sensor
164: Acceleration sensor
165: Illuminance sensor
166: Proximity sensor
167: Distance sensor
168: Line-of-sight sensor
170: Timer
200: Programs
201: Operating system
202: Content viewing application
203: Application A
204: Application B
210: Data
211: Content data
212: Time code
213: Natural light threshold value data
220: Re-viewing button
220a: Re-viewing button
221: Fast-backward button
222: Return button
225: Thumbnail video image
226: Thumbnail video image
228: Audio mark
301: Graph
311: Table data
312: Table data
313: Graph

The invention claimed is:

1. A mobile content viewing device comprising:
a light quantity sensor;
a display;
a touch panel; and
a processor connected to the light quantity sensor, the display, and the touch panel,
wherein
the processor plays and displays content on the display, associates and stores a scene and a time in which the content is played and displayed, acquires a measured value of the light quantity sensor, and
compares the measured value with a predetermined natural light threshold value,
when the processor determines that the measured value is equal to or greater than the natural light threshold value, the processor suggests re-viewing in which the content is returned to and played from a scene of the content displayed on the display at a time when the processor determines that the measured value is equal to or greater than the natural light threshold value, and
when the processor receives input of an instruction for re-viewing from the touch panel, the processor plays and displays the content again from the scene of the content displayed on the display at the time when the processor determines that the measured value is equal to or greater than the natural light threshold value.

2. The mobile content viewing device according to claim 1,
wherein the processor sets the natural light threshold value according to a set value of brightness of the display.

3. The mobile content viewing device according to claim 1,
wherein the processor sets the natural light threshold value according to brightness of a scene of the content displayed on the display.

4. The mobile content viewing device according to claim 1, further comprising a timer,
wherein
the processor uses the timer to measure a time elapsed from a time when the measured value becomes equal to or greater than the natural light threshold value, and
the processor suggests the re-viewing when the elapsed time is equal to or greater than an elapsed time threshold value defined to determine occurrence of a viewing inhibition event.

5. The mobile content viewing device according to claim 4,
wherein the processor suggests the re-viewing when the processor determines that the elapsed time is equal to or greater than the elapsed time threshold value, and determines that a newly acquired measured value is less than the natural light threshold value.

6. The mobile content viewing device according to claim 4,
wherein the processor compares the measured value with a low natural light threshold value for a relatively small quantity of light, and
when a newly acquired measured value becomes equal to or greater than a high natural light threshold value provided for a large quantity of light and larger than the low natural light threshold value during measurement of a time elapsed from a time when the measured value becomes equal to or greater than the low natural light threshold value, the processor suggests the re-viewing even when the elapsed time does not reach the elapsed time threshold value.

7. The mobile content viewing device according to claim 1,
wherein the light quantity sensor is at least one of an in-camera provided on the same surface as the display, an out-camera provided on a side opposite to the display, and an illuminance sensor.

8. The mobile content viewing device according to claim 1,
wherein the processor displays a re-viewing button for suggesting the re-viewing on the display.

9. The mobile content viewing device according to claim 8,
wherein the re-viewing button includes a thumbnail video image played from a scene of the content displayed on the display at the time when it is determined that the measured value is equal to or greater than the natural light threshold value.

10. The mobile content viewing device according to claim 8,
wherein the processor normally displays the re-viewing button on the display in a state in which the re-viewing button is disactivated, and the processor activates the re-viewing button when the processor determines to suggest the re-viewing.

11. The mobile content viewing device according to claim 8,
wherein the processor normally displays a replay button for the content on the display, and
the processor hides the replay button and displays the re-viewing button in a region in which the replay button was present when the processor determines to suggest the re-viewing.

12. The mobile content viewing device according to claim 8,
wherein when the re-viewing button is pressed at least one or more times within a fixed time period defined in advance after the re-viewing button is pressed, the processor plays the content again from a scene preceding a scene of the content displayed on the display at the time when the processor determines that the measured value is equal to or greater than the natural light threshold value.

13. A content viewing method to be executed by a mobile content viewing device, the content viewing method comprising:
- a step of reproducing and displaying content on a display and associating and storing a scene and a time in which the content is played and displayed;
- a step of acquiring a measured value of a light quantity sensor, comparing the measured value with a predetermined natural light threshold value, and when it is determined that the measured value is equal to or greater than the natural light threshold value, suggesting re-viewing in which the content is returned to and played from a scene of the content displayed on the display at a time when it is determined that the measured value is equal to or greater than the natural light threshold value; and
- a step of reproducing and displaying, when input of an instruction for the re-viewing is received, the content again from the scene of the content displayed at the time when it is determined the measured value is equal to or greater than the natural light threshold value.

* * * * *